(12) United States Patent
Morse et al.

(10) Patent No.: US 12,541,662 B2
(45) Date of Patent: Feb. 3, 2026

(54) ANTENNA ARRAYS AND SIGNAL PROCESSING FOR RFID TAG READERS

(71) Applicant: Automaton, Inc., San Diego, CA (US)

(72) Inventors: James Morse, Poway, CA (US); Joe Mueller, San Diego, CA (US); Prokopios Panagiotou, Seal Beach, CA (US); Phillip A Lindsey, Atlanta, KS (US); Paul Petrus, San Jose, CA (US)

(73) Assignee: Automaton, Inc., San Diego, CA (US)

( * ) Notice: Subject to any disclaimer, the term of this patent is extended or adjusted under 35 U.S.C. 154(b) by 0 days.

(21) Appl. No.: 18/743,725

(22) Filed: Jun. 14, 2024

(65) Prior Publication Data

US 2024/0330619 A1    Oct. 3, 2024

Related U.S. Application Data

(63) Continuation of application No. PCT/US2022/081761, filed on Dec. 16, 2022.
(Continued)

(51) Int. Cl.
*H04B 7/0408* (2017.01)
*G06K 7/10* (2006.01)

(52) U.S. Cl.
CPC ..... *G06K 7/10356* (2013.01); *G06K 7/10099* (2013.01); *G06K 7/10415* (2013.01)

(58) Field of Classification Search
None
See application file for complete search history.

(56) References Cited

U.S. PATENT DOCUMENTS

| 5,952,922 A | 9/1999 | Shober |
| 6,184,841 B1 | 2/2001 | Shober et al. |

(Continued)

FOREIGN PATENT DOCUMENTS

| WO | 2023212698 A1 | 11/2023 |
| WO | 2023240088 A2 | 12/2023 |

(Continued)

OTHER PUBLICATIONS

Delos et al., "Phased Array Antenna Patterns—Part 1: Linear Array Beam Characteristics and Array Factor," Analog Dialogue, vol. 54 No. 2, May 2020, 8 pages, available from https://www.analog.com/en/analog-dialogue/articles/phased-array-antenna-patterns-part1.html.

(Continued)

*Primary Examiner* — John F Mortell
(74) *Attorney, Agent, or Firm* — Smith Baluch LLP

(57) ABSTRACT

Radio-frequency identification (RFID) systems use readers to query and locate passive RFID tags in stores, warehouses, and other environments. An interrogation signal emitted by an antenna array from a reader powers up the tag, which replies by modulating and backscattering incident radiation toward the reader. The antenna array in the reader detects the modulated and backscattered radiation, which is usually several of orders of magnitude weaker than the interrogation signal, as the tag's reply. Unfortunately, crosstalk between the antenna elements in the antenna array limits the reader's sensitivity, which in turn limits the range at which the reader can detect and locate tags. Increasing the pitch of the antenna array to greater than half the wavelength of the interrogation signal reduces crosstalk but introduces grating lobes that produce spurious replies. Fortunately, filtering these spurious replies yields sensitive measurements from an (Continued)

antenna array with a pitch large enough to suppress crosstalk.

19 Claims, 17 Drawing Sheets

Related U.S. Application Data

(60) Provisional application No. 63/290,326, filed on Dec. 16, 2021.

(56) References Cited

U.S. PATENT DOCUMENTS

| | | | |
|---|---|---|---|
| 7,830,322 B1 | 11/2010 | Oliver et al. | |
| 9,715,609 B1* | 7/2017 | Fink | H01Q 25/00 |
| 9,881,473 B1 | 1/2018 | Diorio et al. | |
| 10,013,860 B2 | 7/2018 | Hewett | |
| 10,311,264 B1 | 6/2019 | Caporale et al. | |
| 10,386,474 B2 | 8/2019 | Hewett | |
| 10,871,558 B2 | 12/2020 | Hewett | |
| 11,043,093 B2 | 6/2021 | Hewett | |
| 11,215,691 B2 | 1/2022 | Hewett et al. | |
| 11,408,965 B2 | 8/2022 | Hewett et al. | |
| 11,543,512 B2 | 1/2023 | Hewett | |
| 11,915,567 B2 | 2/2024 | Hewett | |
| 11,933,877 B2 | 3/2024 | Hewett | |
| 12,013,474 B2 | 6/2024 | Hewett et al. | |
| 12,117,548 B2 | 10/2024 | Hewett et al. | |
| 12,164,048 B2 | 12/2024 | Hewett et al. | |
| 2008/0114502 A1 | 5/2008 | Breed et al. | |
| 2011/0156870 A1 | 6/2011 | Attew | |
| 2011/0169613 A1 | 7/2011 | Chen et al. | |
| 2012/0293390 A1 | 11/2012 | Shoemaker et al. | |
| 2012/0293391 A1 | 11/2012 | Simmons et al. | |
| 2013/0009820 A1 | 1/2013 | Bonnefoy et al. | |
| 2014/0062728 A1 | 3/2014 | Soto et al. | |
| 2015/0035705 A1 | 2/2015 | Anolik et al. | |
| 2016/0055692 A1 | 2/2016 | Trani | |
| 2017/0293780 A1* | 10/2017 | Koch | H01Q 1/2216 |
| 2017/0365908 A1 | 12/2017 | Hughes et al. | |
| 2018/0102583 A1 | 4/2018 | Trani | |
| 2020/0371229 A1* | 11/2020 | Levitan | G01S 7/285 |
| 2021/0199748 A1 | 7/2021 | Hewett et al. | |
| 2024/0046211 A1 | 2/2024 | Hewett et al. | |
| 2024/0193381 A1 | 6/2024 | Brown, III et al. | |
| 2024/0273986 A1 | 8/2024 | Hewett | |
| 2024/0295623 A1 | 9/2024 | Hewett et al. | |
| 2024/0302522 A1 | 9/2024 | Hewett | |
| 2024/0330614 A1 | 10/2024 | Mueller et al. | |
| 2024/0330619 A1 | 10/2024 | Morse et al. | |
| 2024/0386375 A1 | 11/2024 | Dhar et al. | |

FOREIGN PATENT DOCUMENTS

| | | |
|---|---|---|
| WO | 2023240296 A1 | 12/2023 |
| WO | 2023250401 A1 | 12/2023 |
| WO | 2024196837 A1 | 9/2024 |

OTHER PUBLICATIONS

Delos et al., "Phased Array Antenna Patterns—Part 2: Grating Lobes and Beam Squint," Analog Dialogue, vol. 54 No. 2, Jun. 2020, 5 pages, downloaded from https://www.analog.com/en/analog-dialogue/articles/phased-array-antenna-patterns-part2.html.

Delos et al., "Phased Array Antenna Patterns—Part 3: Sidelobes and Tapering," Analog Dialogue, vol. 54 No. 3, Jun. 2020, 7 pages, downloaded from https://www.analog.com/en/analog-dialogue/articles/phased-array-antenna-patterns-part3.html.

International Search Report and Written Opinion in International Application No. PCT/US2022/081761 mailed May 3, 2023, 26 pages.

Extended European Search Report in European App. No. 22908740.8 dated Nov. 27, 2025, 9 pages.

* cited by examiner

Sensor Measurements

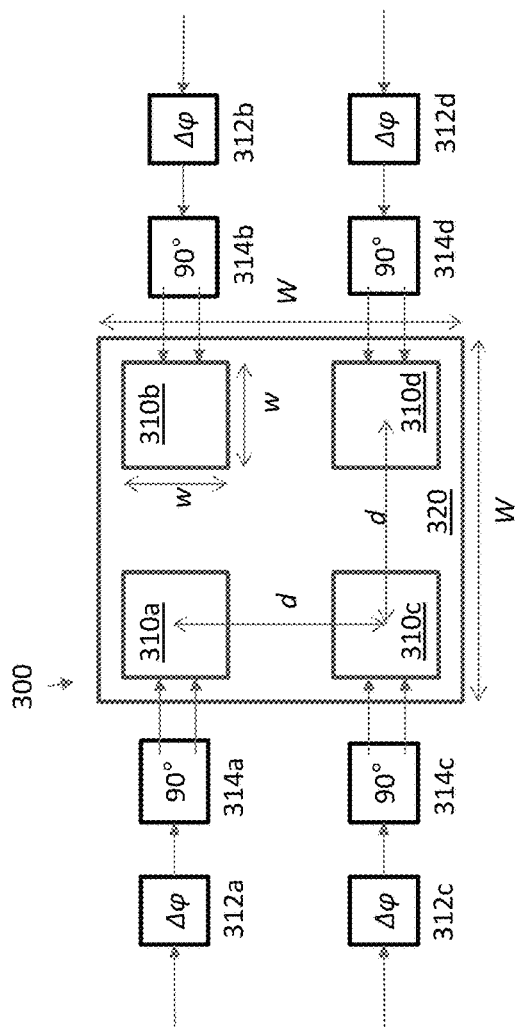
*FIG. 3A*
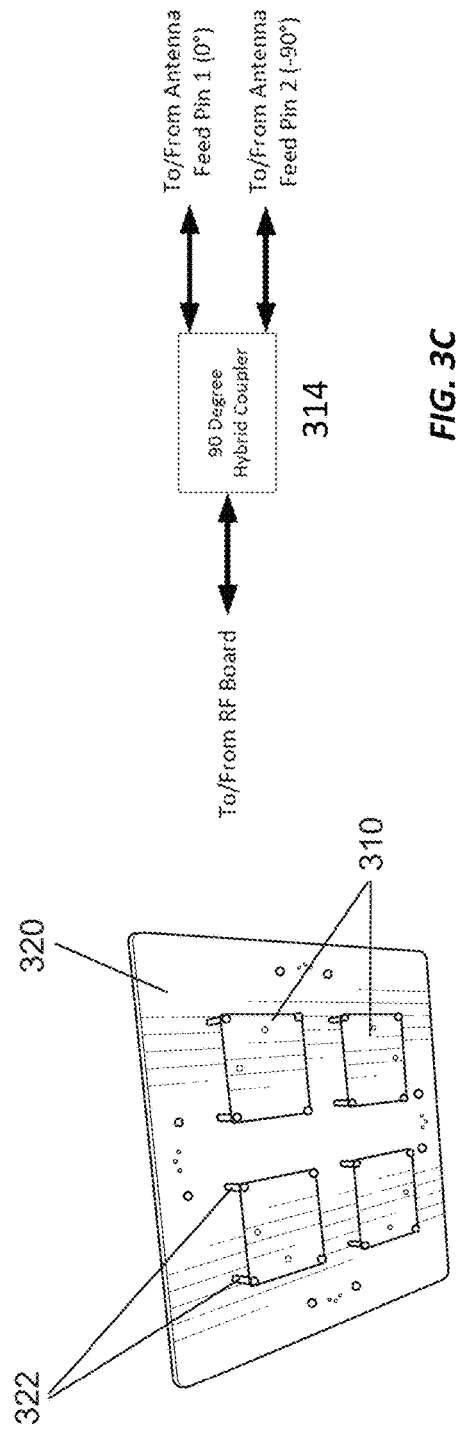
*FIG. 3B*
*FIG. 3C*

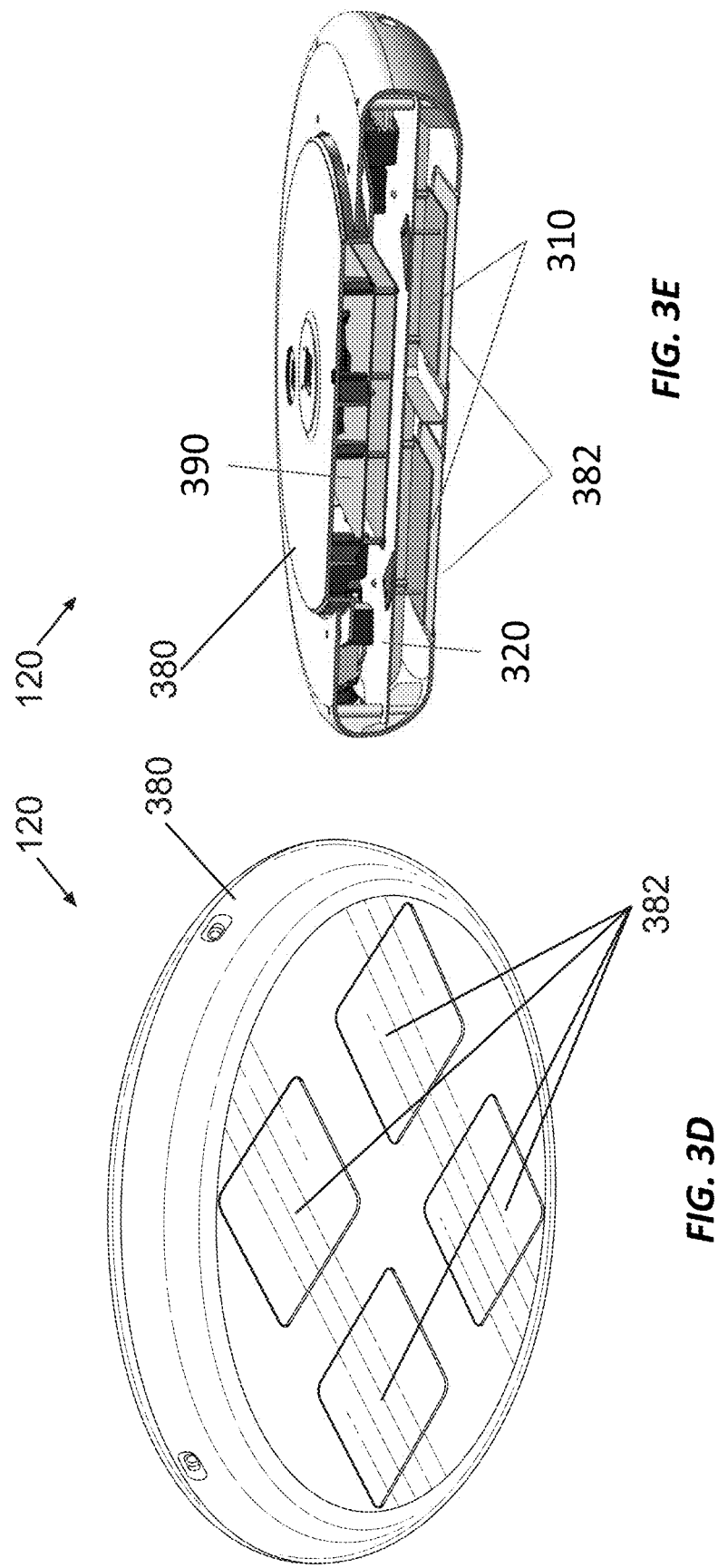

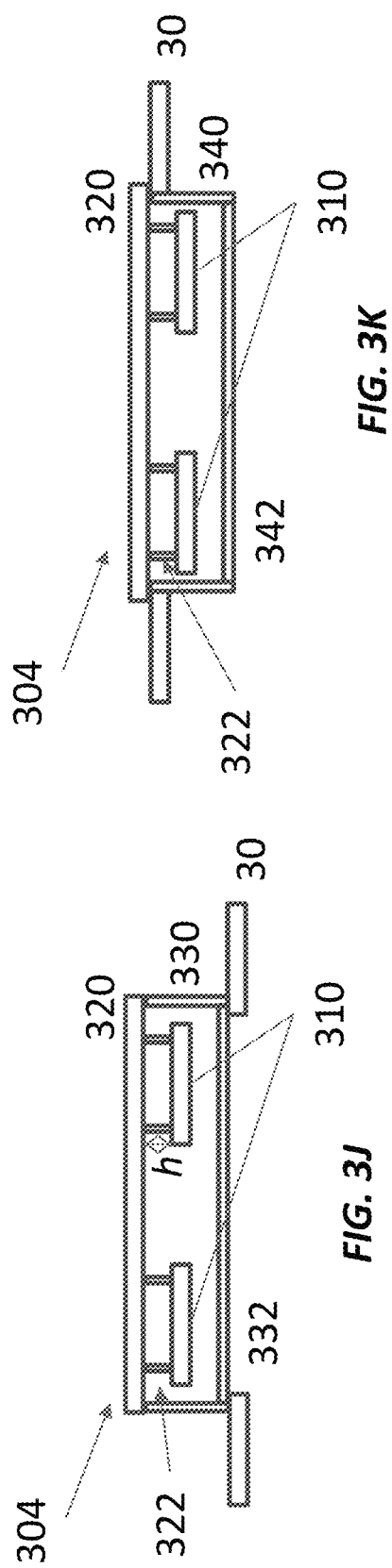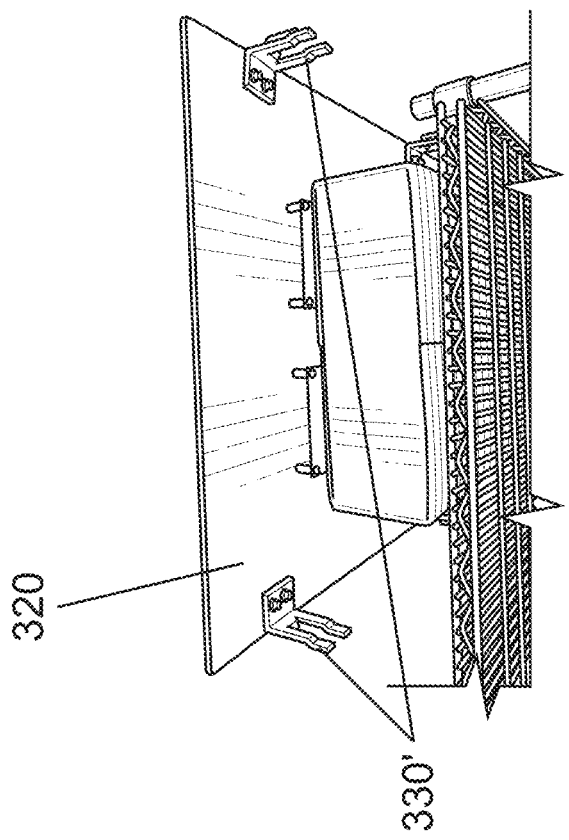

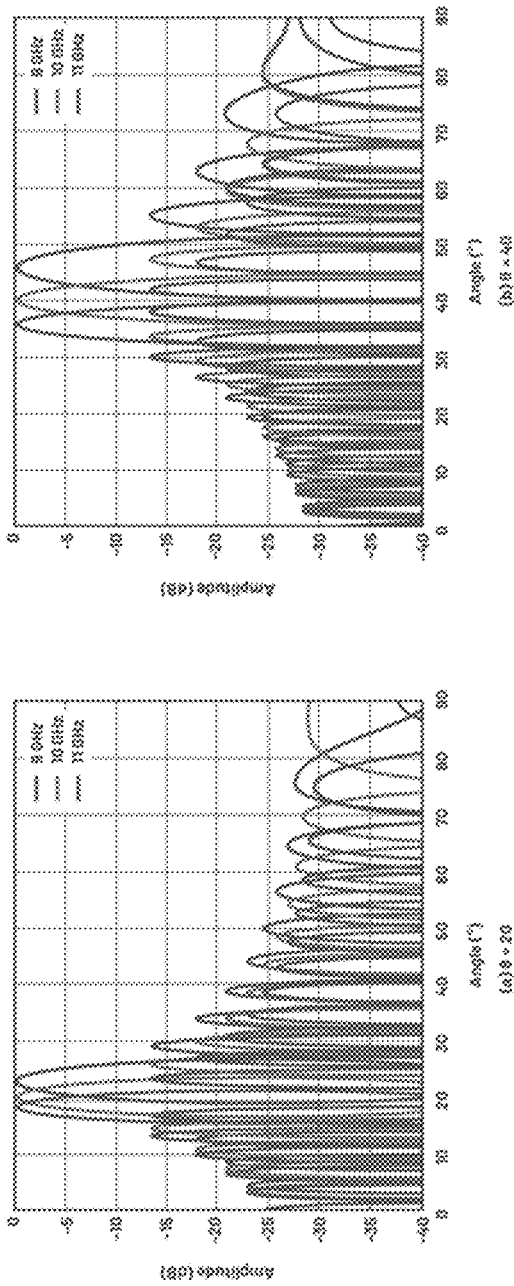
FIG. 10A
FIG. 10B
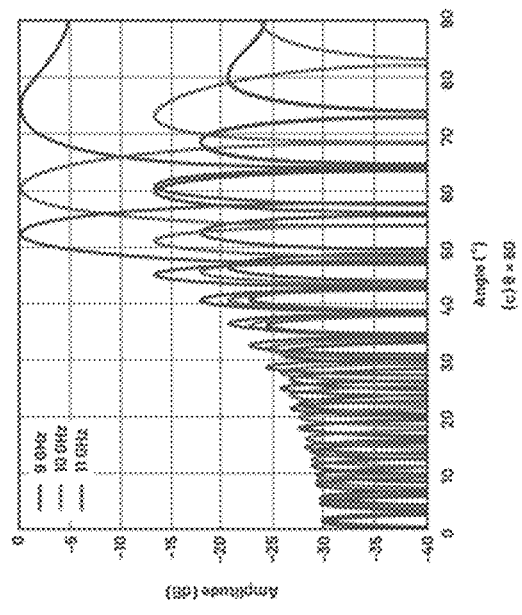
FIG. 10C

ANTENNA ARRAYS AND SIGNAL PROCESSING FOR RFID TAG READERS

CROSS-REFERENCE TO RELATED APPLICATION(S)

This application is a bypass continuation of International Application No. PCT/US2022/081761, filed on Dec. 16, 2022, which claims the priority benefit, under 35 U.S.C. 119 (e), of U.S. Application No. 63/290,326, filed on Dec. 16, 2021. Each of these applications is incorporated herein by reference in its entirety for all purposes.

BACKGROUND

A radio-frequency identification (RFID) tag reader, also called an RFID tag interrogator or simply a reader or sensor, is a device that communicates with RFID tags. A passive RFID tag is powered by the signal transmitted by the reader. The maximum distance or range between the antenna(s) of a reader and a passive RFID tag depends on the maximum power of the RF signal transmitted by the reader toward the RFID tag, the minimum turn-on power or sensitivity of the RFID tag, the maximum power of the tag's reply; loss, noise, and interference, in the communications channel between the reader and the RFID tag; and the sensitivity of the reader.

The round-trip channel loss generally increases with range, so increasing the reader's range generally involves some combination of increasing the transmitted signal power, increasing the tag back-scattering efficiency and sensitivity, reducing noise and interference, and improving the reader sensitivity. Unfortunately, the FCC limits the maximum signal power transmitted to the tag (and hence the amount of power available for the tag's reply) and thermal noise fundamentally limits the reader sensitivity. With some conventional systems, FCC regulations on maximum transmitted power and path loss limit the maximum achievable range from a reader to a passive RFID tag to about 15 meters.

SUMMARY

In an RFID tag reader with an antenna array for transmitting interrogation signals and receiving RFID tag replies, crosstalk between antennas in the antenna array can also limit the maximum round-trip range. Generally, crosstalk is the undesired transfer of signals between communication channels. In an antenna array, crosstalk occurs when one antenna element in the antenna array receives an interrogation signal transmitted by a neighboring antenna element in the antenna array. Crosstalk can also occur via unwanted coupling between the circuit elements that are connected to the different antenna elements in the antenna array.

Unlike noise, crosstalk between antenna elements is difficult to suppress because it is correlated with the signals transmitted by the antenna elements. Fortunately, crosstalk between antenna elements can be reduced by increasing the distance between adjacent antenna elements, e.g., so that the antenna elements are arrayed at a pitch, or center-to-center spacing, of more than half a wavelength at the carrier frequency of the interrogation signals. Unfortunately, increasing the pitch causes grating lobes to appear when the antenna array is steered to angles off boresight. Grating lobes introduce gain in unwanted directions and can confuse the direction-finding process applied to the signal from the antenna array. Fortunately, spurious measurements caused by the grating lobes can be discarded by filtering or by correlating angle-of-arrival (AOA) measurements made by several RFID tag readers simultaneously as described in greater detail below.

An RFID tag reader that filters spurious signals caused by grating lobes can comprise a signal generator, an antenna array, and a processor. In operation, the signal generator generates an interrogation signal at a carrier frequency. The antenna array, which is operably coupled to the signal generator, transmits the interrogation signal to an RFID tag in a direction of a main lobe of an antenna pattern of the antenna array and receives a reply to the interrogation signal from the RFID tag. The antenna array comprises antenna elements arrayed at a pitch, or center-to-center spacing, of more than half a wavelength of the carrier frequency of the interrogation signal, so it also emits radiations along the direction of a grating lobe that appears in the antenna pattern when the main lobe is steered off boresight (normal to the antenna array). The processor, which is operably coupled to the antenna array, distinguishes the reply to the interrogation signal from the RFID tag from a spurious reply caused by the grating lobe when the main lobe is steered off boresight and estimates a location of the RFID tag based on the reply to the interrogation signal from the RFID tag.

The pitch of the antenna elements can be at least 190 millimeters. Setting the pitch of the antenna elements to be more than half the wavelength of the carrier frequency reduces crosstalk between the antenna elements. The antenna array can have an antenna gain on boresight that is at least 27 dB greater than the antenna gain at an elevation of 90° off boresight.

The antenna array can also include a ground plane parallel to and spaced apart from the antenna elements by a distance of at least 22 millimeters. The ground plane can have lateral dimensions of at least 20 inches (508 millimeters) by at least 20 inches (e.g., 595 millimeters by 595 millimeters or 24 inches (609.6 millimeters) by 24 inches). The ground plane can drop into an opening of a suspension grid of a drop ceiling. The RFID tag reader can also include a decorative panel that is coupled to or suspended from the group plane by at least one vertical member and that transmits the interrogation signal and the reply and hides the antenna array.

The processor can distinguish the reply to the interrogation signal from the RFID tag from the spurious reply using one or more of several different techniques. For example, it can discard signals corresponding to estimated RFID tag locations outside of a predetermined volume. It can also discard signals having angles-of-arrival exceeding a predetermined threshold. And it can triangulate possible positions of the RFID tag based on angles-of-arrival measured by other RFID tag readers and discarding possible positions of the RFID tag outside a predetermined zone.

The RFID tag reader can also include a switch that couples the signal generator to the antenna array. The switch can switch the antenna array between a first mode in which the antenna array emits the interrogation signal as a circularly polarized interrogation signal and a second mode in which the antenna array emits the interrogation signal as a linearly polarized interrogation signal. In the second mode, the switch can also switch the interrogation signal between a first linear polarization state and a second linear polarization state orthogonal to the first linear polarization state.

The RFID tag reader may also include a mounting bracket, mechanically coupled to the antenna array, to secure the antenna array with respect to a ceiling. And the RFID tag reader can include an adjustment mechanism, mechanically coupled to the mounting bracket and/or to the antenna array, to adjust an alignment of the antenna array with respect to the ceiling.

An RFID tag location system can be deployed in a room, such as a store or warehouse, by installing RFID tag readers on a ceiling of the room, measuring locations of the RFID tag readers in the room, aligning the RFID tag readers, and connecting the RFID tag readers to a power supply and/or to a system controller. The RFID tag readers can be installed on the ceiling by placing at least one of the RFID tag readers in an opening in a suspension grid of a drop ceiling. The locations of the RFID tag readers can be measured by measuring a distance from a first RFID tag reader to a point on a floor and measuring a distance from the point on the floor to a corner of the room. And the RFID tag readers can be aligned by adjusting an orientation of at least one of the RFID tag readers with respect to the ceiling.

All combinations of the foregoing concepts and additional concepts discussed in greater detail below (provided such concepts are not mutually inconsistent) are contemplated as being part of the inventive subject matter disclosed herein. All combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3A shows a plan view of an antenna array for an RFID tag reader with a pitch greater than half a wavelength for reduced crosstalk and increased isolation between antenna elements.

FIG. 3B is a photograph of a ground plane and antenna elements of a 24" by 24" antenna array.

FIG. 3C shows a 90° hybrid coupler used to feed two feed pins of a patch antenna element in the antenna array of FIG. 3A.

FIG. 3D shows a perspective view of an RFID tag reader with an antenna array like the one shown in FIG. 3A.

FIG. 3E shows a perspective cross-sectional view of the reader of FIG. 3D.

FIG. 3J shows a profile view of an antenna array mounted in an opening of a suspension grid of a drop ceiling.

FIG. 3K shows a profile view of an alternative antenna array mounted in an opening of a suspension grid of a drop ceiling.

FIG. 3L is a photograph of a 24" by 24" antenna array, held up by a box on a metal shelf, with brackets to mount on top of dropped ceiling grid rails.

FIGS. 10A-10C are plots of amplitude versus angle showing beam squint for a linear antenna array steered to different angles and operating at different frequencies.

DETAILED DESCRIPTION

Figure 1A:
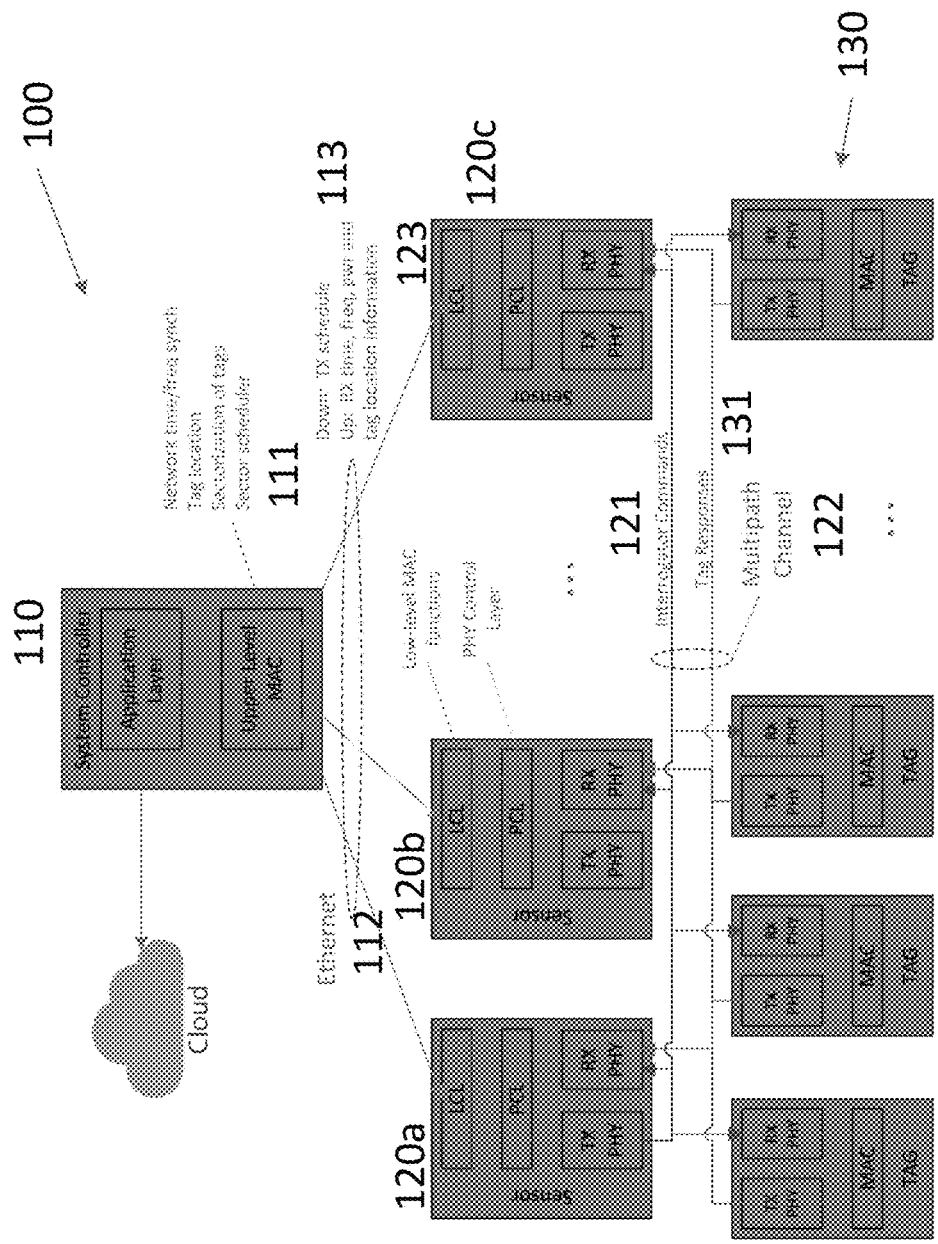
FIG. 1A shows an RFID tag location system with a central controller coupled to a set of RFID tag readers, each of which can be switched between interrogator and listener modes, via an Ethernet local area network (LAN).
Figure 1C:
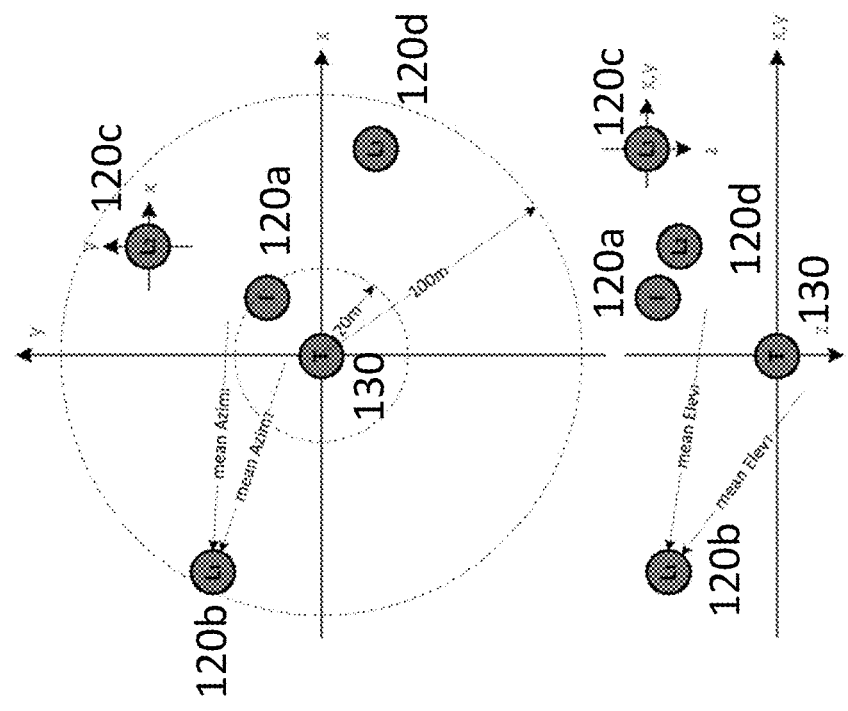
FIG. 1C illustrates angle-of-arrival (AOA) measurements made with one sensor in interrogator mode and other sensors in listener mode.
Figure 1B:
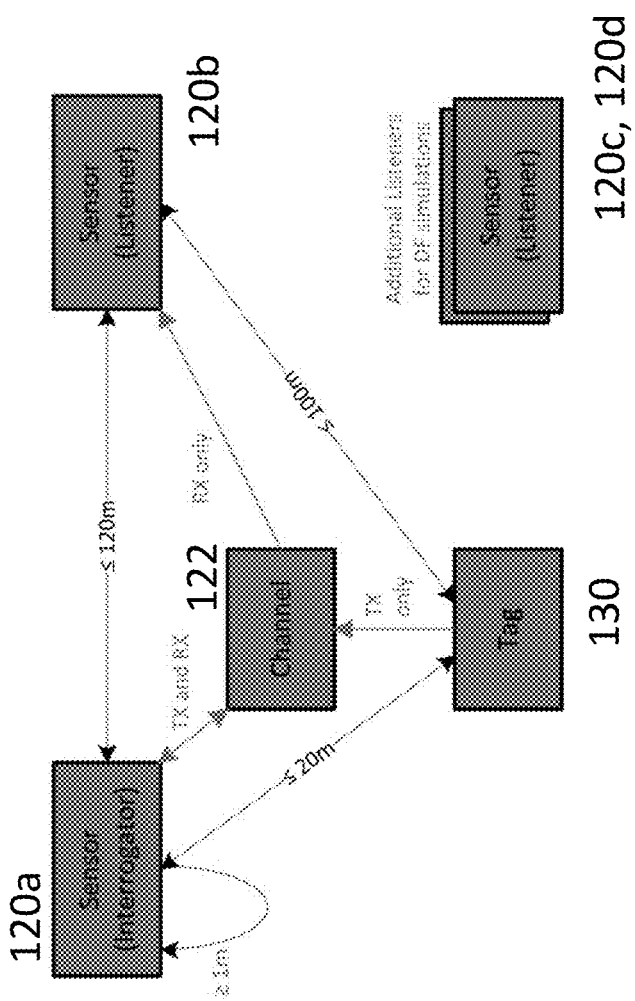
FIG. 1B illustrate how sensors in interrogator and listener modes can trigger and detect replies from a passive RFID tag.

FIGS. 1A-1C illustrate an RFID tag location system 100 that locates one or more RFID tags 130 with several RFID tag readers 120a-120d (collectively, readers or sensors 120) coupled to a system processor 110, also called an appliance or system controller. Each reader or sensor 120 includes an antenna array, described in detail below, with antenna elements (also called antennas) that are arrayed at a pitch, or center-to-center spacing, that is greater than half the wavelength of the carrier frequency of the signals transmitted and received by the reader 120. In other words, the distance between the centers of adjacent antenna elements in the antenna array is greater than half the wavelength of the carrier frequency of the signals transmitted and received by the reader 120. At this pitch, unwanted crosstalk between adjacent antenna elements is lower and so is the beam width, leading to finer angular resolution.

Unfortunately, increasing the pitch causes grating lobes (replicas of the antenna lobe) to appear when the antenna array transmits off boresight. These grating lobes can cause the array to excite tags in unwanted directions, thus introducing errors when locating the tags 130 based on knowledge of the transmit-steering direction. Further, the grating lobes reduce the available power in the desired transmit direction, which can reduce the range at which tags 130 can be read by the RFID reader 120. On the receive side, significant sidelobes can appear in the angle-of-arrival (AOA) spectrum detected by the reader 120, leading to erroneous AOA estimates. Processors in the system controller 110 can reduce the transmit grating lobes by carefully selecting the beam-steering angles. The system controller 110 can also reduce AOA estimation errors by using sophisticated search processes that can distinguish between true and false peaks in the AOA spectrum, e.g., using a priori information about each tag's probable location and/or information obtained by other readers 120 to eliminate the incorrect estimates. This enables RFID tag location at greater ranges and/or with greater accuracy than is possible at higher levels despite the grating lobes.

Interrogator and Reader Modes

Each reader 120 in FIGS. 1A-IC can be switched between an interrogator mode and a listener or receive-only mode. In the interrogator mode, the reader 120 transmits interrogation signals at a carrier frequency (e.g., 902 to 928 MHz in the United States or 865 to 868 MHz in Europe) and receives tag responses to those interrogation signals at the same carrier frequency. And in the listener mode, the reader 120 receives both interrogation signals from other readers 120 and tag responses to those other interrogation signals.

Typically, only one reader 120 is in interrogator mode at a time while the other readers 120 are in listener mode. The reader 120 that is in interrogator mode interrogates a tag 130, and it and the readers 120 in listener mode within range receive the tag's reply. For N readers 120, this means making up to N measurements of the tag's reply simultaneously even though only one reader 120 may be transmitting an interrogation message at a time. This N-fold increase in the number of simultaneous measurements can be used to increase the speed (e.g., by a factor of N), fidelity (e.g., by a factor of $\sqrt{N}$ through incoherent averaging), or speed and fidelity of the RFID tag location performed by the system 100. The readers 120 may make more simultaneous measurements in a round-robin fashion, with each reader 120 serving as the interrogator in turn while the other readers 120 act as listeners, further increasing measurement speed and/or fidelity. Because the listeners are not powering the tags, and hence do not suffer from crosstalk between antenna elements that are transmitting and receiving simultaneously, they can detect tag responses at much greater ranges, making it possible to make measurements from distances/locations that are simply not possible with conventional RFID tag location systems.

The readers 120 are connected to the system controller 110 via respective Ethernet connections 112 or other suitable (usually wired) connections as shown in FIG. 1A. For convenience, these may be Power-over-Ethernet (POE) connections that provide both electrical power and network connectivity to the readers 120. The Ethernet connections 112 may connect the readers 120 to each other as well. The system controller 110 has a clock synchronized to network time and uses that clock to synchronize the readers 120 via the Ethernet connections 112. The readers 120 should be synchronized well enough that when different readers 120 time stamp the received replies from the same tag 130 sent at the same time, the system controller 110 can group and process the detected replies together. The synchronization should also be good enough to prevent excessive guard time between interrogation cycles, or hops (e.g., allowing a minimum intra-hop spacing of 1 millisecond).

This synchronization may reveal that the latency of one or more of the Ethernet connections 112 and/or the variation in latency among the Ethernet connections 112 exceeds the allotted window or guard time for an RFID tag 130 to respond to an interrogation signal or command 121 from a reader 120, making it impractical for the readers 120 to communicate with each other about scheduling via the wired connections 112. If these latencies are larger than the allotted tag reply window/guard time, then the readers 120 may simply detect the broadcast commands 121 with their antenna arrays instead of sensing separate signals about the commands 121 to each other via the wired connections 112. The readers 120 can also communicate with each other wirelessly (e.g., over the same RF channel used for communicating with the tags 130) using reader-specific commands instead of via the local area network provided by the Ethernet connections 112. For example, reader-specific commands can coordinate and control mobile readers (discussed below).

The system controller 110 also includes a processor that generates a schedule 113 for interrogating the RFID tags 130. The schedule lists the time(s) at which each reader 120 is supposed to be in interrogator mode and in listener mode. That is, the schedule 113 lists when each reader 120 is supposed to emit interrogation signals 121, including queries and other interrogator commands. The schedule 113 may also list windows when each reader 120 should expect to receive interrogation signals 121 from other readers 120 and tag replies prompted by those interrogation signals 121. The system controller 110 transmits this schedule 113 to the RFID tag readers 120 via the Ethernet connections 112. It stores the schedule 113 in a local memory coupled to the processor. The system controller 110 receives tag reply data 123, including receive time, frequency, power, and tag location information, from the RFID tag readers 120 and stores this data 123 in the memory for later processing.

The readers 120 interrogate the tags 130 as follows. Again, one reader 120 is in interrogator mode at a time, with the other readers 120 in listener mode. The reader 120 in interrogator mode broadcasts a continuous wave RF signal that powers up the tags 130 within range. The reader 120 in interrogator mode then broadcasts the interrogation signal 121, which the tags 130 within range receive via a wireless, multipath channel 122 through the store, warehouse, factory, or other environment in which the system 100 is deployed. At least one of the tags 130 responds to the interrogation signal 121 with a tag reply 131 that arrives at the reader 120 in interrogator mode within a predefined time window after the interrogation signal 121. The tag reply 131 is a backscattered version of the signal from the reader 130 modulated by the tag 130, for example, with an electronic product code (EPC) that uniquely identifies the tag 130. The entire interrogation/reply sequence is called a hop. The readers 120 in listener mode detect the interrogation signal 121 and tag reply 131 over the same wireless, multipath channel 122. The tag reply 131 as detected by the different readers 120 can be used to locate the tag 130 faster and/or more precisely than is possible with conventional RFID tag location systems.

FIGS. 1B and 1C illustrate how the RFID tag system 100 can be used to make multiple AOA measurements of a single tag reply 131 at the same time for faster and/or more accurate tag location measurements. In this case, the readers 120 are arrayed on the ceiling of a room, such as a room in a retail store or warehouse. There may be tens to hundreds of readers 120 in the environment, with each reader 120 separated from its nearest neighbor by up 120 meters (e.g., by 5, 10, 15, 20, 25, 30, 40, 50, 60, 70, 80, 90, 100, 110, or 120 meters) and connected to the controller 110 (not shown) via an Ethernet or other wired connection. The distance separating each pair of readers 120 may be based on the maximum range for powering a tag 130, e.g., if the maximum range for powering a tag 130 is 10 meters, then the readers 120 may be within 20 meters of each other. Each reader 120 is oriented so that its antenna(s) emits interrogation signals 121 largely toward the floor, with less RF energy propagating sideways. If the readers 120 are closer to each other, their antenna patterns may be scanned over smaller angular ranges, avoiding the appearance (and deleterious effects) of grating lobes.

In this example, reader 120a is in interrogator mode and readers 120b-120d are in listener mode. Reader 120a transmits an interrogation signal 121 via a free-space channel 122, which could include one or more reflections, to an RFID tag 130. Reader 120a should be close enough to the tag 130, which is passive, for the interrogation signal 121 to power or charge the tag 130 enough to produce a detectable reply 131. Given constraints on maximum power, channel loss, and tag backscattering efficiency, the distance between the RFID tag 130 and reader 120a without self-interference cancellation is about 20 meters or less (e.g., 15, 10, or 5 meters). Effective self-interference cancellation reduces the noise floor and increases the dynamic range of the reader's analog-to-digital converter (ADC), extending the range from the reader 120a to the RFID tag 130 (e.g., by a factor of 2 for a 6 dB reduction in the noise floor).

The other readers 120b-120d can be farther away from the tag 130 (e.g., up to 25, 50, 75, or even 100 meters away); because they are not powering or charging the tag 130, so they do not suffer from self-interference/transmit signal leakage. As a result, they do not have to perform self-interference cancellation in order to detect the response 131. The maximum distance between the other readers 120b-120d and the tag 130 depends on the amplitude of the reply 131, the channel loss, and the sensitivity of the readers 120 and can be up to 500 meters with the right receiver, antenna, and path-loss conditions. (The amplitude of the tag's reply is generally 10 dB below its turn-on power, which is typically around −17 dBm and decreasing over time as semiconductor power efficiencies increase.) The channel loss is around 32 dB at 1 meter and increases by about 6 dB for every doubling of distance. The sensitivity of a reasonable RFID receiver is −80 dBm.) The readers 120 may be arrayed within the room so that every reader 120 should be able to detect replies from every tag 130 or so that not every reader 120 can detect replies from every tag 130, depending in part on the shape and size of the room.

The tag 130 may have a dipole antenna that radiates the reply 131 in a donut-shaped pattern. Because the readers 120 are at different locations with respect to the tag 130, this RF field (the reply 131) impinges each reader 120 from a different azimuth and/or elevation as shown at top and bottom, respectively, of FIG. 1C. Each reader 120 can calculate the corresponding azimuth and elevation AOAs and transmit the calculated AOAs for each tag 130 to the controller 110. The controller 110 can estimate each tag's location in two dimensions (e.g., at a fixed height) using the corresponding azimuth and elevation. The controller 110 may also aggregate the AOAs from the different readers 120 and use them to estimate the tag's location, e.g., by trilateration or triangulation. Because a single interrogation signal 131 yields multiple simultaneous AOA measurements by up to all of the readers 120 in the system 100, the controller 110 can derive or estimate the location of the RFID tag 130 in three dimensions after just one hop, unlike in conventional RFID systems, which may take many hops to locate a tag 130 in three dimensions. With more AOA measurements, the controller can estimate the tag's location relative to the readers 120 more precisely. If the readers' locations are known, the controller 110 can use them to estimate the tag's absolute location as well.

Readers 120b-120d also detect the interrogation signal 121 from reader 120b before detecting the tag reply 131. When a reader 120 is in listener mode, it scans the relevant RFID communication band (e.g., 902 to 928 MHz in the United States or 865 to 868 MHz in Europe) for the interrogation signal 121, which may be broadcast on one of many channels (e.g., 20 or 50 channels) within that band. When a reader 120 in listener mode detects an interrogation signal 121 on a particular channel, it listens for a reply 131 on the same channel within a predetermined or preset time window of the end of the interrogation signal 121. The reader 120 may also demodulate or decode the interrogation signal 121 and use the decoded interrogation signal 121 to interpret the reply 131 from the tag 130.

The interrogation signal 121 tells the tag 130 how to respond (i.e., the modulation, preamble-type, and bit rate for the reply 123). The readers 120 in listener mode listen for the commands 121 to know how the tag 130 should respond to the command 121. The readers 120 in listener mode also determine the end-time of the command 121 to know when to expect the tag reply 123 based on the timing constraints placed on the tag's reply 123.

Because the readers 120 are mounted on the ceiling and broadcast interrogation signals 131 downward (toward tags 130), they generally detect the interrogation signals 131 from other readers 120 via non-line-of-sight (NLOS) paths. In FIGS. 1B and 1C, for example, reader 120a emits the interrogation signal 131 downward, causing at least a portion of the signal 131 to reflect or scatter off the floor, shelving, and/or other objects. The other readers 120b-120d detect this reflected or scattered energy, possibly instead of or in addition to detecting energy that propagates directly from reader 120a without scattering or reflecting off another surface. Even accounting for attenuation along the NLOS path, the detected interrogation signal 131 has an amplitude great enough to be detected with high fidelity (e.g., SNR>10 dB) by the readers 120b-120d in listener mode.

The RFID tag location system 100 can also include or interact with handheld readers, vehicle- or cart-mounted readers, or other readers that are not connected to the system controller 110 via a wired connection. These readers may be switchable between interrogator and listener modes. They can also be conventional readers that operate exclusive as interrogators, i.e., by transmitting interrogation signals and receiving tag replies without detecting or processing interrogation signals from other readers. In either case, when a handheld or mobile reader transmits an interrogation signal, the readers that are both in listener mode and within range detect both that interrogation signal and any tag replies. These readers may compute the estimated AOA of the tag reply and the location of the responding tag from the tag replies and report the locations, AOA, and/or tag reply parameters (e.g., magnitude, phase, time of arrival) to the system controller for more processing.

The stationary listeners can also measure the AOAs to the handheld or mobile readers based on the received interrogation signals. This can be especially useful if the location of the handheld or mobile reader is not known precisely.

If desired, the handheld reader may broadcast a command to the readers that switches them into listener mode before transmitting the interrogation signal. Alternatively, the readers can scan the RFID channels for handheld readers when not transmitting. Or the readers (including the handheld reader) can use a self-synchronizing pseudo-noise (PN) sequence to drive the frequency hopping such that all readers (fixed and/or handheld) can synchronize to the hopping pattern.

RFID Tag Reader Architecture

Figure 2:
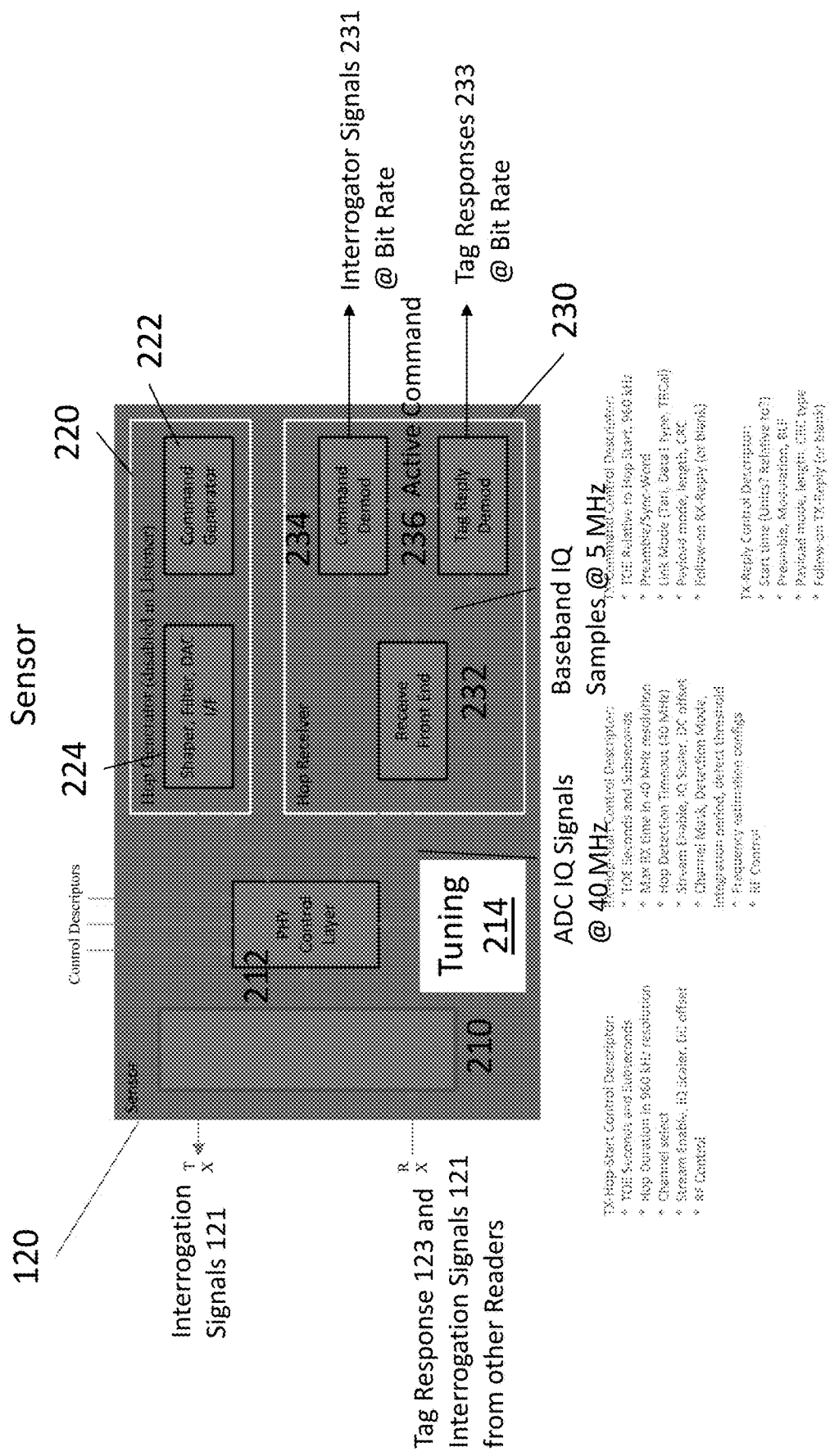
FIG. 2 shows an RFID tag reader that can be switched between interrogator and listener modes.

FIG. 2 illustrates the reader 120 in greater detail, including components that can be enabled or disabled if the reader 120 is in interrogator mode or listener mode. The reader 120 includes an RF antenna array and front end 210, a processor 212, an RF calibration and tuning block 214, a hop generator 220, and a hop receiver 230. The RF antenna array and front end 210 may include one or more antenna elements, amplifiers, filters, and/or other analog RF components for transmitting RFID interrogation signals 121 and receiving tag replies 131 and RFID interrogation signals 121 from other readers. The processor 212 may be implemented in a microcontroller, application-specific integrated circuit (ASIC), field-programmable gate array (FPGA), or other suitable device and controls the operation of the reader 120, including, if desired, steering of the reader's antenna array. It stores information in and retrieves information from a memory (not shown) and communicates with the system controller 110 via a network connection (not shown), such as an Ethernet connection. And the processor 212 switches the reader 120 between interrogator and listener modes, with the hop generator 220 being disabled or off in listener mode and enabled or on in interrogator mode and the hop receiver 230 being enabled or on in both modes. The RF calibration and tuning block 214 performs RF calibration and tuning functions.

The hop generator 220 generates the interrogation signals 121 that the reader 120 transmits to the RFID tags 130 and other readers 120 (FIGS. 1A-1C). It may also generate commands or communications signals intended for other readers 120, e.g., on a dedicated reader communications channel or with particular preambles or payloads. It includes a digital command generator 222, which generates the digital queries, commands, and/or other information conveyed by the interrogation signals 121, and RF electronics 224 for turning the digital signals from the command generator 222 into analog signals suitable for transmission by the antenna 210. The RF electronics 224 may include a digital-to-analog converter (DAC) that converts the digital signal into a baseband analog signal, a mixer and local oscillator to mix the baseband analog signal up to an intermediate frequency for broadcast, and filters and/or pulse shapers to remove sidebands and/or spurs.

The hop receiver 230 includes a receiver front end 232 coupled to a command demodulator 234 and a tag reply demodulator 236. Generally, the receiver front end 232 digitizes, down-converts, and estimates the phase of the RF signals detected by the antenna(s). In interrogator mode, it also cancels any self-interference caused by the interrogation signals 121, for example, due to leakage within the receiver. Unfortunately, the receiver front end 232 generally cannot cancel crosstalk between different antenna elements or the circuits coupled to those antenna elements because the crosstalk is correlated with the interrogation signal 121. Fortunately, this crosstalk can be reduced or suppressed by spacing the antenna elements farther apart from each other as explained in greater detail below.

When the reader 120 is in listener mode, the receiver front end 232 does not transmit an interrogation signal, nor does it perform self-interference cancellation. In listener mode, the reader 120 detects the channels on which the other readers 120 transmit interrogation signals 121 and estimates the frequencies of those other interrogation signals 121.

There are a variety of ways to configure the receiver front end 232; in this example, it receives analog in-phase and quadrature (I/Q) signals at 40 MHz and converts them into digital I/Q samples at baseband (5 MHZ) as explained in greater detail below. The command demodulator 234 is enabled when the reader 120 is in listener mode and demodulates the baseband command I/Q samples to produce interrogator signals 231 at the command bit rate (e.g., 40 kbps to 160 kbps). The command demodulator 234 uses the command payload to determine what the reader 120 in interrogator mode is asking of the tag 130 (e.g., modulation, preamble type, expected reply type, etc.). For example, the reader 120 in interrogator mode may ask the tag 130 to send the first 64 bits of its electronic product code (EPC) using Miller-2 modulation at 320 kHz backscatter link frequency (BLF) with the standard preamble. The readers 120 in listener mode use that information to decode the tag reply 131. The command demodulator 234 is disabled when the reader 120 is in interrogator mode. The tag reply demodulator 236 is enabled in both interrogator and listener modes and demodulates the baseband tag reply I/Q samples to produce tag reply signals 233 at the tag reply bit rate.

Antenna Arrays with Increased Isolation

FIGS. 3A and 3B illustrate an antenna array 300 that can be used in the RFID tag reader 120 described above. As shown in FIGS. 3A and 3B, this antenna array 300 includes four patch antenna elements 310a-310d (also called patch antennas or antenna elements) and a ground plane 320. Each patch antenna 310 is in the shape of a square with lateral dimensions of w=120.4 mm and made from a single-sided printed circuit board (PCB) that is about 1.57 mm thick with copper traces that are 0.04 mm thick (the remaining thickness of the PCB is dielectric for structure). Generally, each patch antenna element 310 should include conductive material that is about 0.02-0.08 mm thick. At this thickness, the conductive material is usually disposed on, embedded in, or laminated to a non-conductive material, such as fiberglass, for rigidity.

The ground plane 320 is also a square and has lateral dimensions of W=20 inches (508 mm), 595 mm, 24 inches (609.6 mm), or more. Other ground plane shapes are also possible, including circular, curved (e.g., portions of spherical or conical sections), or faceted (e.g., pyramidal) ground planes with patch antenna elements on different facets. The ground plane 320 can be made of any conductive material and should be thick enough to hold its rigidity and flatness. For example, the ground plane 320 can be an aluminum sheet with a thickness of 1/16". The ground plane 320 is parallel to and spaced apart from the patch antenna elements 310 by a distance h=22 millimeters. This distance h between the antenna elements 310 and the ground plane 320 affects the gain, isolation, and general characteristics of the antenna performance. It can be as small as 3 mm at the expense of reduced gain. Generally, this distance can be from about h=3 mm to about h=50 mm (e.g., 20-25 mm) depending on the size of the antenna and the application.

FIG. 3A also shows phase shifters 312a-312d and 90° hybrid couplers 314a-314d that are used to steer the main lobe of the antenna array's antenna pattern. When the antenna array 300 transmits, the phase shifters 312*a*-312*d* receive the hop generated by the hop generator 220 (FIG. 2) and impart phase delays that steer the beam emitted by the antenna array in a desired direction. Similarly, when the antenna array 300 receives, the phase shifters 312*a*-312*d* steer the antenna array's receptivity pattern so that tag replies coming from certain directions experience higher antenna gain. The reader can perform steering in interrogator mode, listener mode, or both interrogator and listener modes.

Figure 3G:
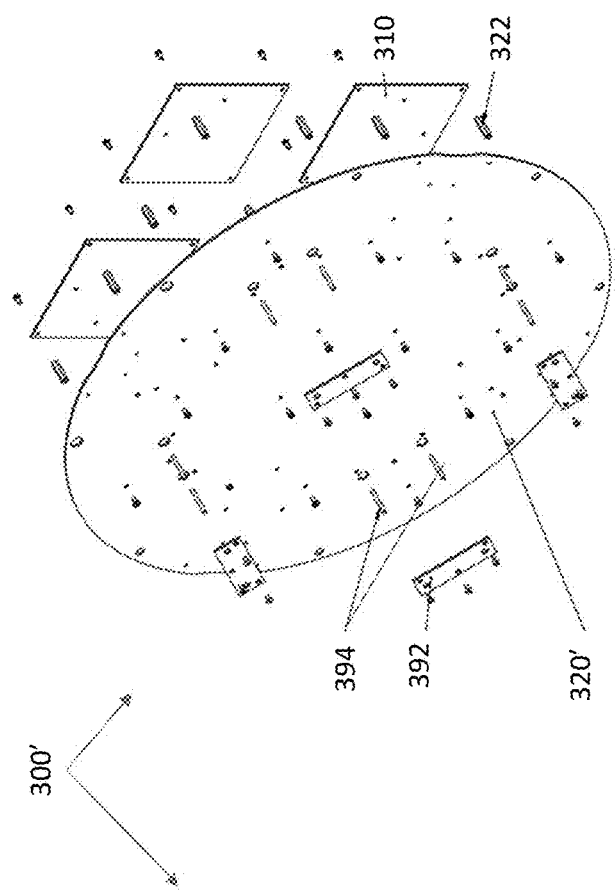
FIG. 3G is an exploded view of the four-element antenna array of FIG. 3F.

The 90° hybrid couplers 314*a*-314*d*, one of which is shown in greater detail in FIG. 3C, can be used to feed the patch antenna elements 310*a*-310*d*. Each 90° hybrid coupler 314 receives the RF signal that the corresponding patch antenna 310 is supposed to transmit, e.g., from the hop generator 220. The 90° hybrid coupler 314 splits the input RF signal into two copies, one of which is phase shifted by 90° with respect to the other. These copies drive a pair of feed pins or feed ends 394 (FIG. 3G, described below) on the corresponding patch antenna element 310. Feeding both feed pins or feed ends 394 simultaneously with phase delay using the 90° hybrid coupler 314 causes the antenna array 300 to emit circularly polarized interrogation signals.

With a few extra switches, the antenna array 300 can be switched between emitting interrogation signals with circular, vertical, or horizontal polarizations. Vertical and horizontal polarizations boost the received tag reply strength by up to about 3 dB at the cost of interrogating every tag twice (once with each polarization) to avoid missing RFID tags with dipole antennas that are not aligned to the polarization of the emitted signals. Using circular polarization makes it possible to interrogate the RFID tags more quickly, although perhaps with a lower received tag reply strength due to the incomplete projection of the interrogation signal polarization state onto the RFID tag dipole antenna. If desired, the antenna array 300 can emit circularly polarized interrogation signals during the day for faster readout and alternating vertical and horizontal polarizations at night for more sensitive measurements.

Each patch antenna element 310 is 120 mm by 120 mm square but could be slightly bigger or smaller based on desired gain. The patch antennas 310 are arrayed on a square grid with a center-to-center spacing, or pitch d, of more than half a wavelength of the carrier frequency of the lowest-frequency (shortest-wavelength) interrogation signals. In the United States, the carrier frequency typically ranges from 902 MHz to 928 MHz, which translates to a maximum pitch d of more than about 166 mm (902 MHZ). In Europe, the carrier frequency typically ranges from 865 MHz to 868 MHz, which translates to a maximum pitch d of more than about 173 mm (865 MHZ). Increasing the pitch to be 5, 10, 15, 20, 25, 30, 35, or 40 mm greater than half the carrier-frequency wavelength increases the isolation and reduces the crosstalk between adjacent patch antenna elements 310. Increasing the pitch also increases the relative phase differences between the signals received at the different patch antenna elements 310 for a given angle of arrival, raising the phase differences (further) above the noise floor. It also decreases the spatial sampling frequency below the Nyquist sampling limit, potentially resulting in aliasing as described below, with greater pitches worsening the aliasing. A pitch d=190 mm yields good isolation without undue aliasing at carrier frequencies of 902 MHz to 928 MHZ.

As should be readily understood and appreciated by those of skill in the art, there are other antenna arrays suitable for use in inventive RFID tag readers. For instance, other antenna arrays may have more or fewer antenna elements (e.g., 3, 5, 6, or more antenna elements). Those antenna elements may have different shapes (e.g., rectangles, cross shapes, or hexagons) or be of a different type (e.g., dipole antennas instead of patch antennas). They can be arranged in arrays of different shapes (e.g., linear, rectangular, hexagonal, or circular arrays). And they can have different dimensions and different pitches, depending on their sizes, shapes, and operating (carrier) frequencies.

FIGS. 3D and 3E show perspective and perspective cross-sectional views, respectively, of an RFID reader 120 with the patch antenna elements 310 and a ground plane 320 in a housing or enclosure 380 that can be mounted or suspended from a ceiling or other structure. The enclosure 380 also contains one or more 13" (330.2 mm) by 13" PCBs that sit in an aluminum frame and hold the phase shifters 312 and 90° hybrid couplers 314 (FIGS. 3A and 3C). The enclosure 380 is roughly dome shaped and can be made of acrylonitrile butadiene styrene (ABS), polyvinyl chloride (PVC), vinyl, or another suitable material that is substantially transparent at the frequencies of the interrogation signals and replies. The enclosure 380 may include thinner sections 382 opposite the patch antenna elements 310. These sections 382 are as thin as possible (e.g., <⅛" or 3.175 mm thick) so that they transmit as much in-band RF energy to and from the patch antenna elements 310 as possible (i.e., these sections 382 should attenuate as little of the interrogation signals and as little of the tag replies as possible) without compromising the enclosure's structural integrity.

Figure 3F:
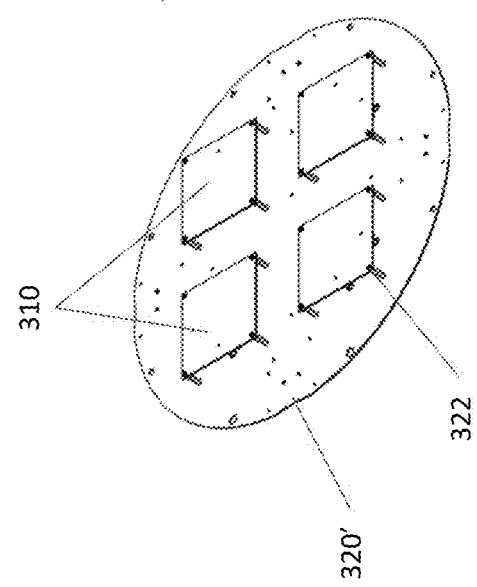
FIG. 3F is a perspective view of a four-element antenna array with a circular ground plane and four 1" by 3" printed circuit boards (PCBs), each of which contains a 90° hybrid split circuit, suitable for use in the RFID tag reader of FIG. 3D.
Figure 3I:
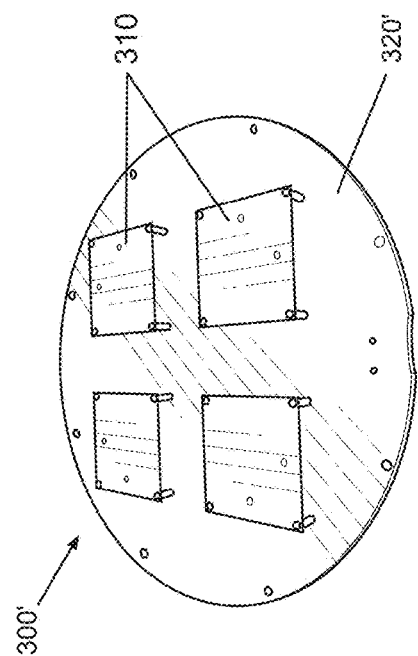
FIG. 3I is a photograph showing the antenna elements in the four-element antenna array of FIG. 3F.
Figure 3H:
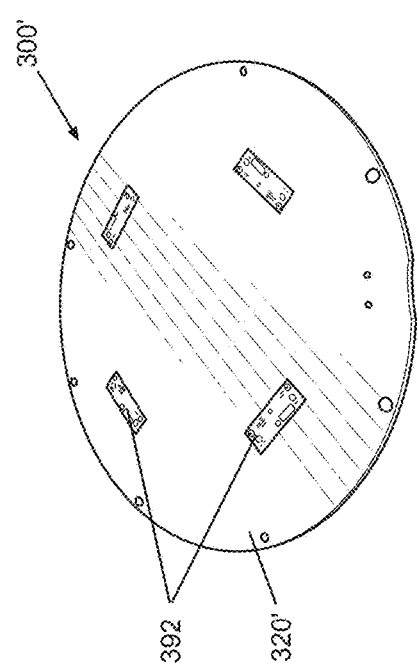
FIG. 3H is a photograph showing the four 1" by 3" PCBs on the ground plane side of the four-element antenna array of FIG. 3F.

FIGS. 3F-3I show an antenna array 300' suitable for use in the reader 120 of FIGS. 3A and 3C in greater detail. FIG. 3F is a perspective view of the antenna array 300' showing the patch antenna elements 310 mounted on a circular ground plane 320' with standoffs 322. FIG. 3G shows an exploded view of the antenna array 300' from the opposite side, with four 1" by 3" (25.4 mm by 76.2 mm) PCBs 392 replacing the larger PCBs 390 shown in FIG. 3C. These PCBs 392 are mounted on the back side of the ground plane 320', which is a circular aluminum panel with a 520 mm diameter. Each PCB 392 includes the corresponding phase shifter 312 and 90° hybrid coupler 314 for a corresponding antenna element 310, with the hybrid coupler outputs connected to the antenna element 310 by a corresponding pair of feed pins 394. FIGS. 3H and 3I are photographs of the fully assembled antenna array 300' from the ground plane side and the antenna element side, respectively.

FIGS. 3J-3L illustrate techniques for mounting the antenna array 300 in a drop ceiling. A drop ceiling, also called a dropped ceiling, T-bar ceiling, or suspended ceiling, is a secondary ceiling that is suspended from the main ceiling. Drop ceilings are very common in retail and office environments A drop ceiling typically has a suspension grid 30 that hangs from the main ceiling and defines square and/or rectangular openings. In the United States and Canada, these openings are typically 24 inches by 24 inches (609.6 mm by 609.6 mm) or 24 inches by 48 inches (609.6 mm by 1219.2 mm) and accommodate ceiling tiles, light fixtures, and fluorescent light tubes are the same size. In Europe, the cell size in the suspension grids is 600 mm by 600 mm, while the ceiling tiles and fixtures are slightly (5 mm) smaller at 595 mm by either 595 mm or 1195 mm.

The antenna array 300 can be mounted in, above, or from an opening in the suspension grid 30 of the drop ceiling. In FIG. 3J, the antenna array 300 is housed in a box that sits on the edge of the suspension grid 30, ringing the perimeter of the opening. The ground plane 320 fits into the opening, which may be 24 inches by 24 inches (in the United States) or 595 mm by 595 mm (in Europe). For these sizes and larger sizes, the ground plane 300 can be made by fitting 13-inch (330.2-millimeter) by 13-inch printed circuit boards (PCBs) into or onto an aluminum frame and replacing the long (er) traces with coaxial cables.

In FIG. 3J, the ground plane 320 forms one side of the box, with brackets or sidewalls 330 and an aesthetic panel 332 that is transparent to the interrogation signals and tag replies forming the other sides of the box. The aesthetic panel 332 can be made of plastic, such as ABS, PVC, Vinyl, or a blend thereof. It should be as thin as possible to reduce its effect on the antenna array's RF performance yet thick enough to have strength or structure for stability (e.g., <⅛" thick). The box is between the suspension grid 30 and the main ceiling (not shown), much like a lighting fixture, with the entire antenna array 300 hidden within the drop ceiling. Alternatively, the antenna array 300 can be mounted in a box that protrudes partially below the drop ceiling, as shown in FIG. 3K, with the ground plane 320 sized to fit into the opening defined by the suspension grid 30. Again, the ground plane 320 forms part of a box, with an RF-transparent aesthetic panel 340 and sidewalls 342 forming the other sides of the box.

In both cases, the aesthetic panels and sidewalls help to hide the antenna array 300 and to make the entire device more attractive and less obtrusive. And in both cases, the box can contain and/or be coupled to the RFID tag reader's other components, including the rest of the front end, the processor, and other components, including those shown in FIG. 2. The RFID tag reader can be coupled to the system controller and/or to other RFID tag readers via Ethernet cables that run between the drop ceiling and the main ceiling and that carry both electrical power and communications signals as described above with respect to FIGS. 1A-IC.

FIG. 3L shows an antenna array with brackets 330' extending from the ground plane 320 for mounting the antenna array on top of the ceiling grid rails (suspension grid 30) above a normal ceiling grid tile. (In FIG. 3L, the antenna array rests on a box, which is on a metal wire shelf.) Testing shows that the typical ceiling grid material does not attenuate or scatter the RF signals transmitted and received by the antenna array very much, if at all. If the attenuation and scattering are low enough, then the antenna array can be mounted above a conventional ceiling, which keeps the antenna array completely hidden from view. The antenna array can be coupled to the system controller and/or to other RFID tag readers via Ethernet cables that run between the drop ceiling and the main ceiling as described above.

Deploying Antenna Arrays

RFID tag readers, including their antenna arrays, can be used in retail stores, warehouses, supply rooms, libraries, or other environments for tracking objects with RFID tags. Generally, the antenna arrays are mounted or hung from the ceiling, e.g., at heights of 11, 12, 13, 14, or 15 feet above the floor, so that they emit interrogation signals downward, toward RFID tags on shelves, tables, clothing racks, or other storage units. The antenna arrays are arranged so that they provide adequate coverage of the entire space, e.g., on a grid with a spacing chosen so that tags within all or substantially all of the volume of the store or other environment can be interrogated. If the RFID tag readers have a maximum range in interrogator mode of 10 meters, this may translate to adjacent RFID tag readers being within 10 meters of each other, or at least one sensor for every 100 square meters or so. Mounting an antenna array closer to the ground (e.g., at 11 feet instead of 14 or 15 feet) may clip or reduce its range, leading to a denser installation (more sensors per square foot) for adequate coverage. Antenna arrays in a denser installation may steer beams over smaller scanning ranges, leading to fewer (and lower) grating lobes due to off-boresight scanning.

The RFID tag readers can be arrayed in a regular (periodic) fashion or distributed irregularly across the ceiling. In a typical installation, the installers may assess space for optimal sensor placement based on location of fixtures that hold the objects tagged with RFID tags. In a clothing store, for example, the RFID tag reader may be positioned above clothing racks or shelves that hold clothes whose labels or price tags include RFID tags. These positions may be shifted or adjusted to provide more complete or uniform sensor coverage and/or to account for obstacles, such as walls, furniture, or other fixtures, which could occlude or impede measurements by the antenna array. For larger installations, antenna array placement may be less critical if the coverage is denser. Once in place, each sensor can be connected to the system controller for power and data via a Power-over-Ethernet (POE)-compatible cable or other cable or connector.

Once the RFID tag readers have been installed, the installers measure their actual locations with respect to each other and/or with respect to an origin of a coordinate system used to locate the RFID tags. This origin can be selected as one corner of the room in which the readers are mounted so that all coordinates in the coordinate system are positive. Each antenna array's position can be measured by projecting the position onto the floor (e.g., with a string hanging from the antenna array), then measuring the distance(s) and/or angle(s) from the projected position on the floor to the origin (e.g., with a laser measure) or to two walls.

Once the actual positions of antenna arrays have been determined to the desired level of accuracy, each antenna array can be aligned with respect to the other antenna arrays, to the floor, to the ceiling, and/or to a selected slice or plane through the coordinate system. For example, each antenna array can be tipped, tilted, and/or rotated using screws or other adjustment mechanisms built into their mounting brackets for precise angular alignment. Each bracket may also have one or more screws for translating the antenna array in one, two, or three dimensions as well and/or for rotating the antenna array about one, two, or three different axes. These brackets may be similar to those used to align projectors or displays.

Grating Lobes in Antenna Arrays with Pitches Greater than Half a Wavelength

Figure 4:
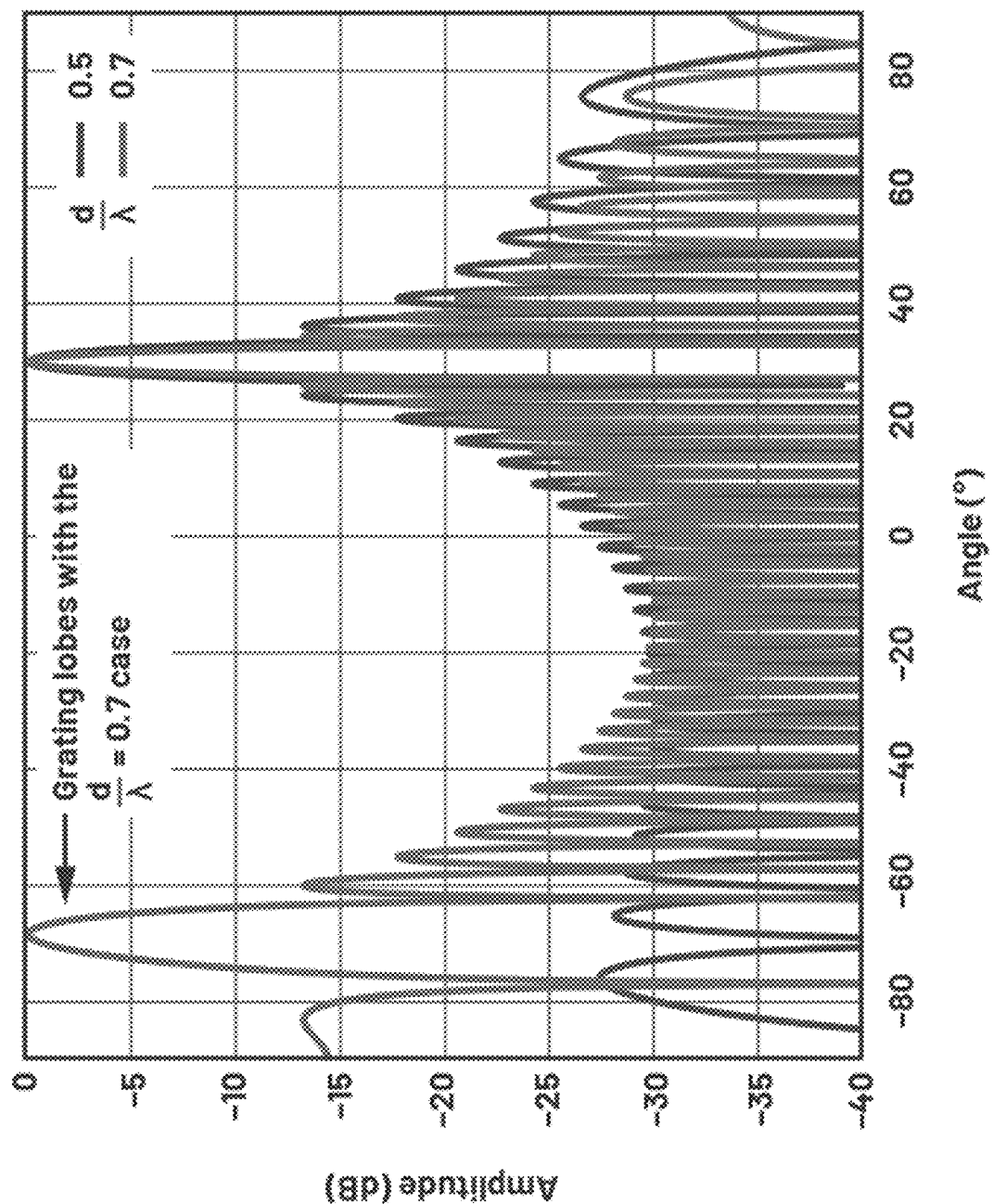
FIG. 4 is a plot of directivity versus angle for linear antenna arrays with pitches of half a wavelength and more than half a wavelength steered off boresight (0° in the coordinate system of the linear arrays).

FIG. 4 illustrates how increasing the pitch or spacing between antenna elements in an antenna array causes grating lobes to appear in the antenna pattern. It shows traces for 32-element, linear antenna arrays with grating pitches of d=0.5λ and d=0.7λ steered to an elevation angle of 30° off boresight, which corresponds to elevation angle of 0° in this coordinate system. (Although these arrays are linear and have more elements than the antenna array in FIG. 3A, the same principles apply to a 2D patch antenna array as explained below.) The main lobes for both antenna arrays are centered at 30°. The main lobe for the antenna array with the larger pitch (d=0.7λ) is narrower than the main lobe for the other antenna array, which can translate to finer angular resolution. However, the antenna pattern for the antenna array with the larger pitch (d=0.7λ) also includes a grating lobe centered at −70°. Steering the main lobe (e.g., by adjusting the relative phases of the antenna elements) steers the grating lobe as well and changes the amplitude of the grating lobe.

FIGS. 5A-5F, 6A-6F, and 7A-7F illustrate main and grating lobes as a function of transmit angle for a four-element patch antenna array like the one shown in FIG. 3A. In each set of plots, the antenna array is steered to transmit along different elevation and azimuth angles. (In this coordinate system, boresight is at an elevation angle of 180° and an azimuth angle of 0°.) When the antenna array is steered off boresight, grating lobes appear because the antenna elements are arrayed at a pitch greater than half a wavelength at the carrier frequency. And because the antenna array is a square array (and hence lacks 360° rotational symmetry about the boresight direction), the grating lobes split and/or change shape as a function of azimuth angle.

Figure 5B:
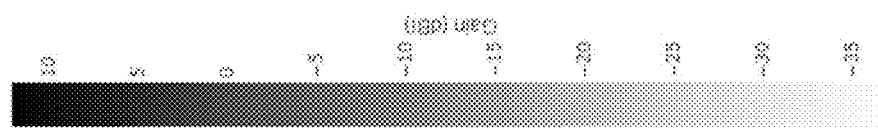
FIGS. 5A-5F are linear and logarithmic plots of the gain of a four-element square antenna array with a pitch greater than half a wavelength steered to transmit at boresight (an elevation angle of 180° and an azimuth angle of 0° in the coordinate system of the antenna array).
Figure 5B:
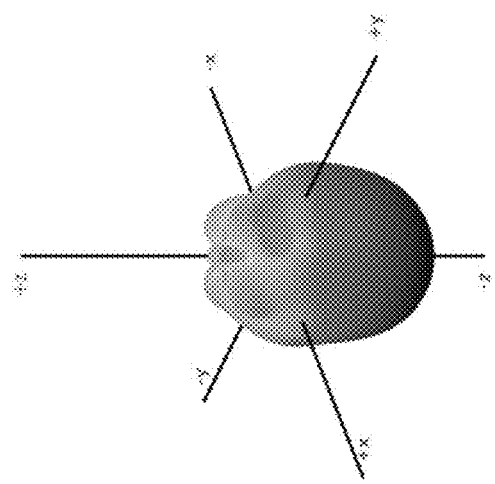
Figure 5A:
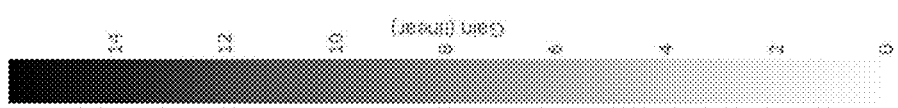
Figure 5A:
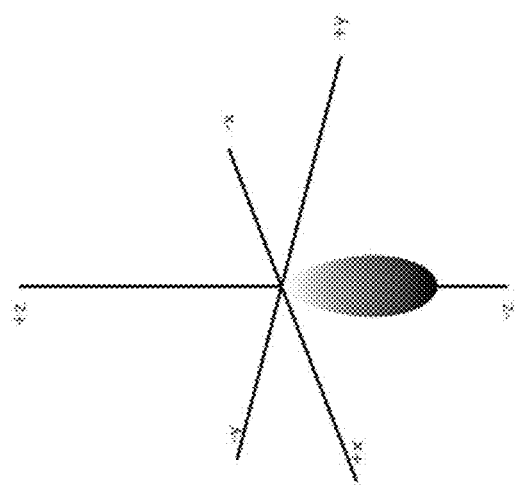
Figure 5C:
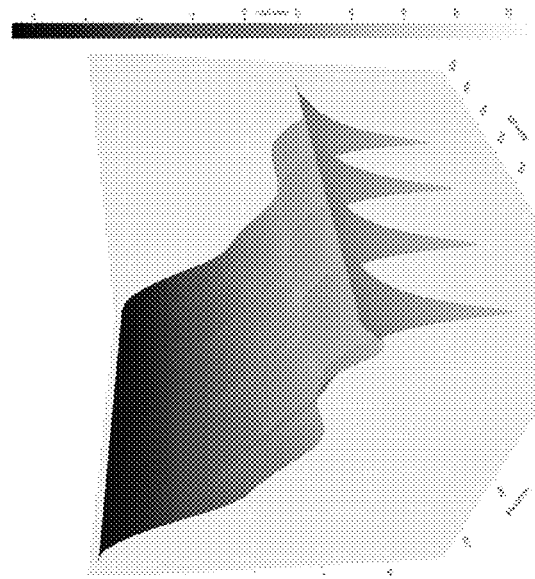
Figure 5E:
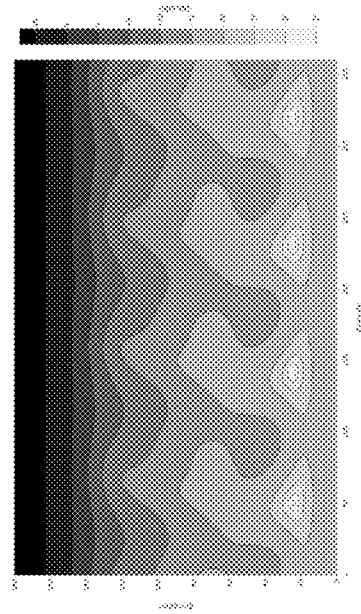
Figure 5D:
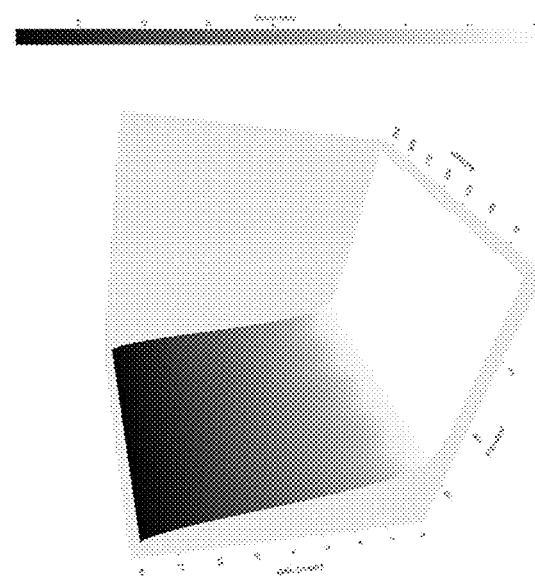
Figure 5F:
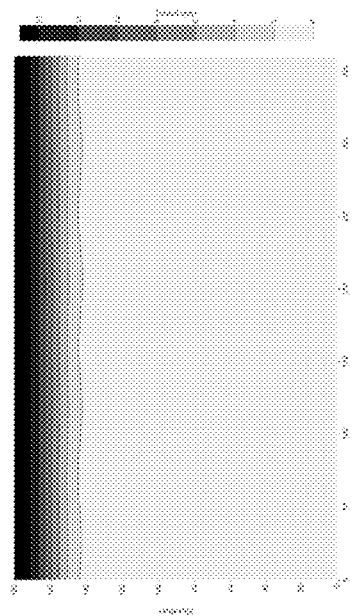

FIG. 5A-5F show the gain when the antenna array transmits along the boresight direction, i.e., at an elevation angle of 180° and an azimuth angle of 0°. FIGS. 5A and 5B show the gain pattern plotted in Cartesian coordinates on linear and logarithmic scales, respectively. The main lobe is fairly narrow and points straight down. FIGS. 5C-5F show the gain pattern plotted as a function of elevation and azimuth angles in linear or logarithmic scales. Small sidelobes are visible on the logarithmic plots in FIGS. 5D and 5F.

Figure 6B:
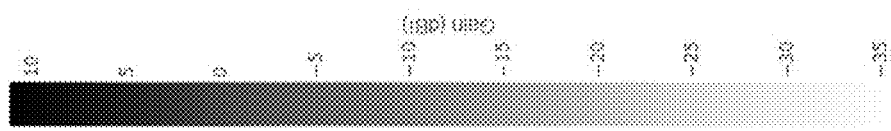
FIGS. 6A-6F are linear and logarithmic plots of the gain of a four-element square antenna array with a pitch greater than half a wavelength steered to transmit at an elevation angle of 135° and an azimuth angle of 0°.
Figure 6B:
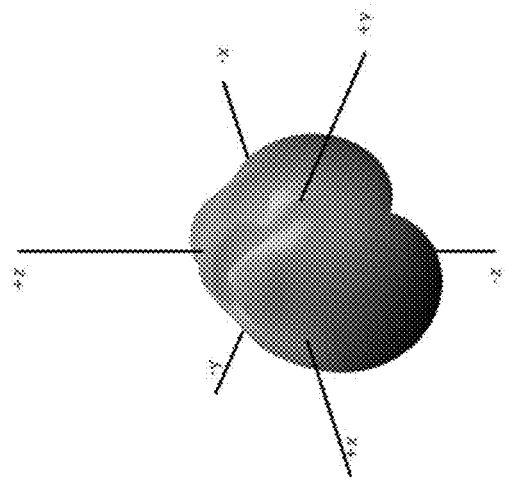
Figure 6A:
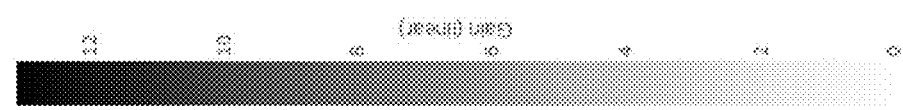
Figure 6A:
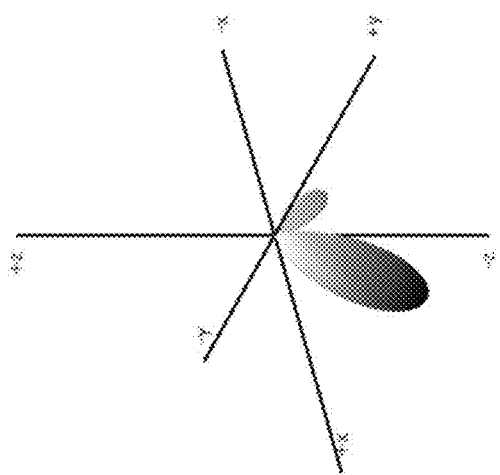
Figure 6C:
Figure 6D:
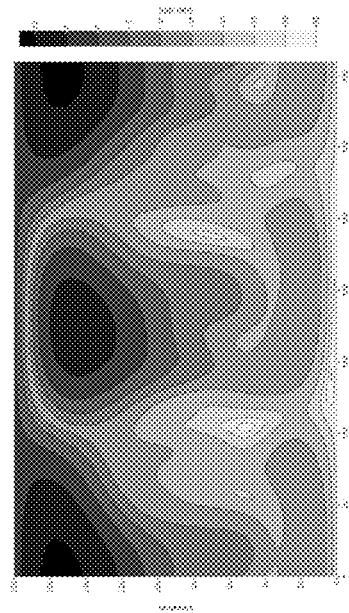
Figure 6E:
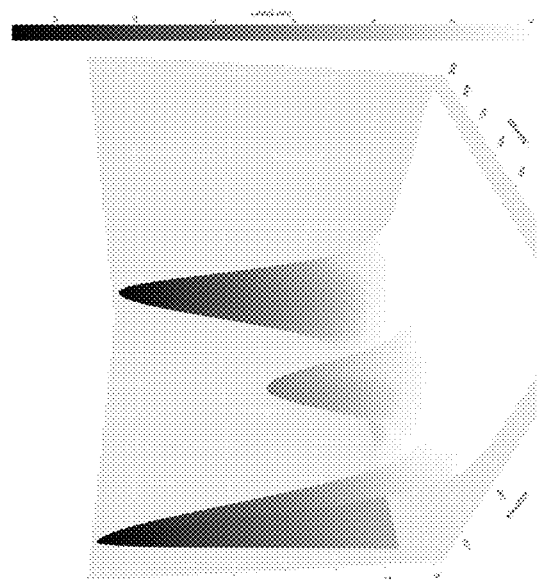
Figure 6F:
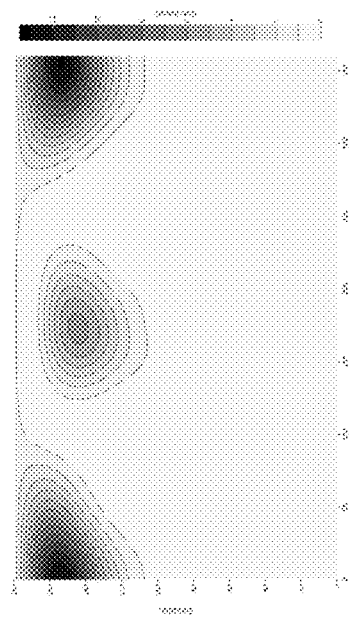

FIG. 6A-6F show the gain when the antenna array transmits along an elevation angle of about 155° and an azimuth angle of 0°. FIGS. 6A and 6B show both a main lobe pointing along an elevation angle of 155° and an azimuth angle of 0° and a grating lobe pointing along an elevation angle of 20° and an azimuth angle of 0°. FIGS. 6C-6F show that the peak amplitude of the grating lobe is about 3 dB lower than the peak amplitude of the main lobe.

Figures 7A, 7B:
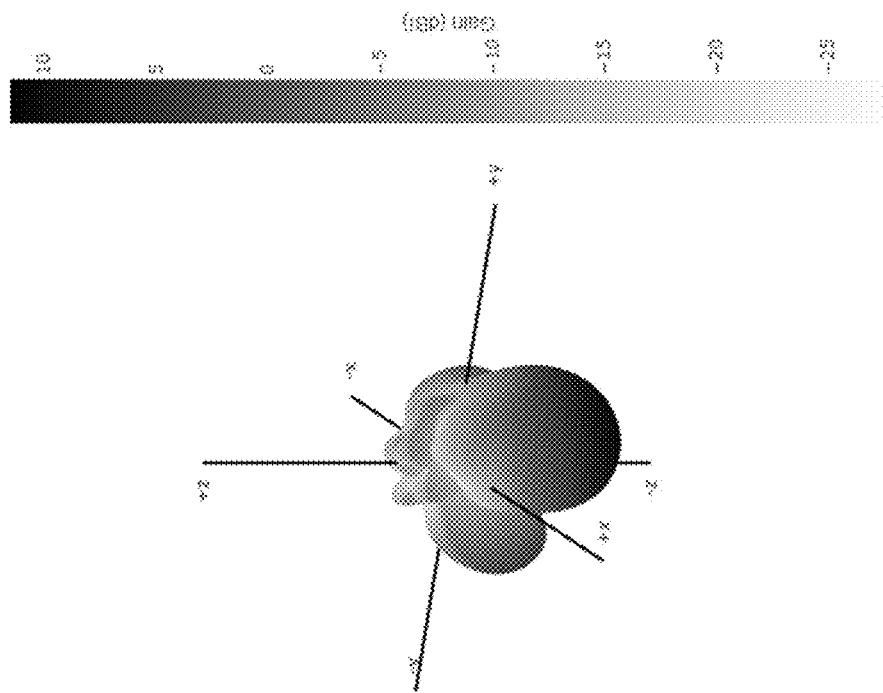
FIGS. 7A-7F are linear and logarithmic plots of the gain of a four-element square antenna array with a pitch greater than half a wavelength steered to transmit at an elevation angle of 135° and an azimuth angle of 45°.
Figure 7D:
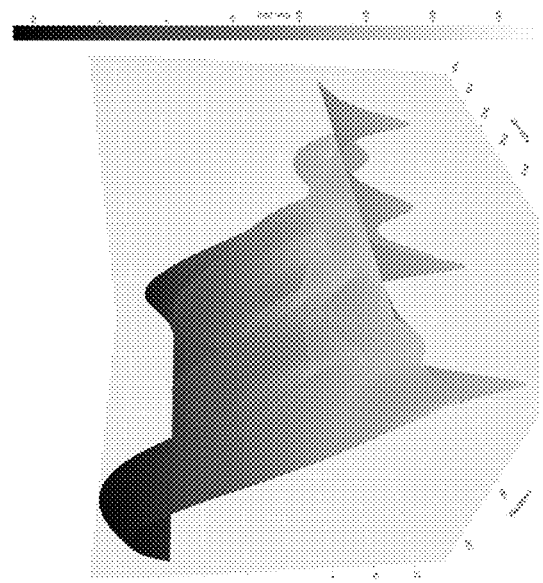
Figure 7F:
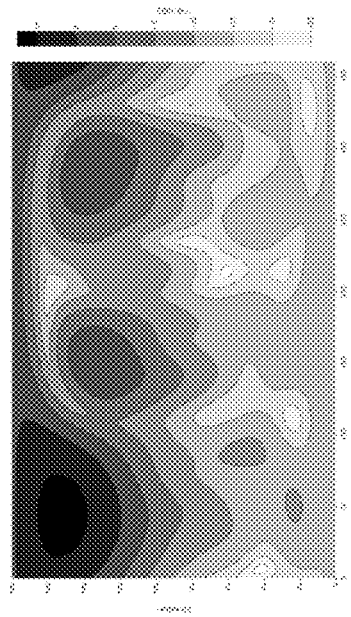
Figure 7C:
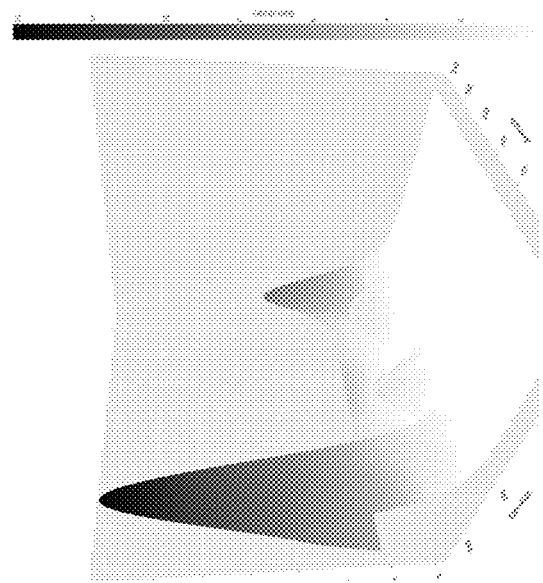
Figure 7E:

FIG. 7A-7F show the gain when the antenna array transmits along an elevation angle of 135° and an azimuth angle of 45°. FIGS. 7A and 7B show both the main lobe, which points along an elevation angle of about 155° and an azimuth angle of 45°, and grating lobes, which point along an elevation angle of about 135° and azimuth angles of about 150° and about 290°. There are two grating lobes at this azimuth angle because the antenna array lacks 360° rotational symmetry about the azimuthal axis. FIGS. 7C-7F show that the peak amplitudes of the grating lobes are about 4.5 dB lower than the peak amplitude of the main lobe.

Interrogating RFID Tags with Main and Grating Lobes

In FIGS. 4, 6A-6F, and 7A-7F, the antenna arrays have radiation (gain) patterns with main lobes and grating lobes whose amplitudes equal or approach the amplitudes of the main lobes. In each example, because the grating lobe amplitude is so high, the antenna array transmits signals along the corresponding elevation and azimuth angles with nearly the same gain as the interrogation signals transmitted along the elevation and azimuth angles of the main lobe. As a result, the antenna array can activate RFID tags in the direction of the main lobe (the desired direction) and in the direction(s) of the grating lobe(s) (undesired directions).

If tags in all of these directions reply to the interrogation signal, it may be difficult to distinguish the replies from tags in the desired direction from the replies from tags in undesired directions. Multipath and other effects may compound this problem, especially if there is no line-of-sight path to the tag in the direction of the main lobe. Fortunately, the true elevation angle to the tag can be determined even when grating lobes are present in the antenna pattern with additional measurements and/or with a priori knowledge of the tag's likely location as described below.

Figure 8:
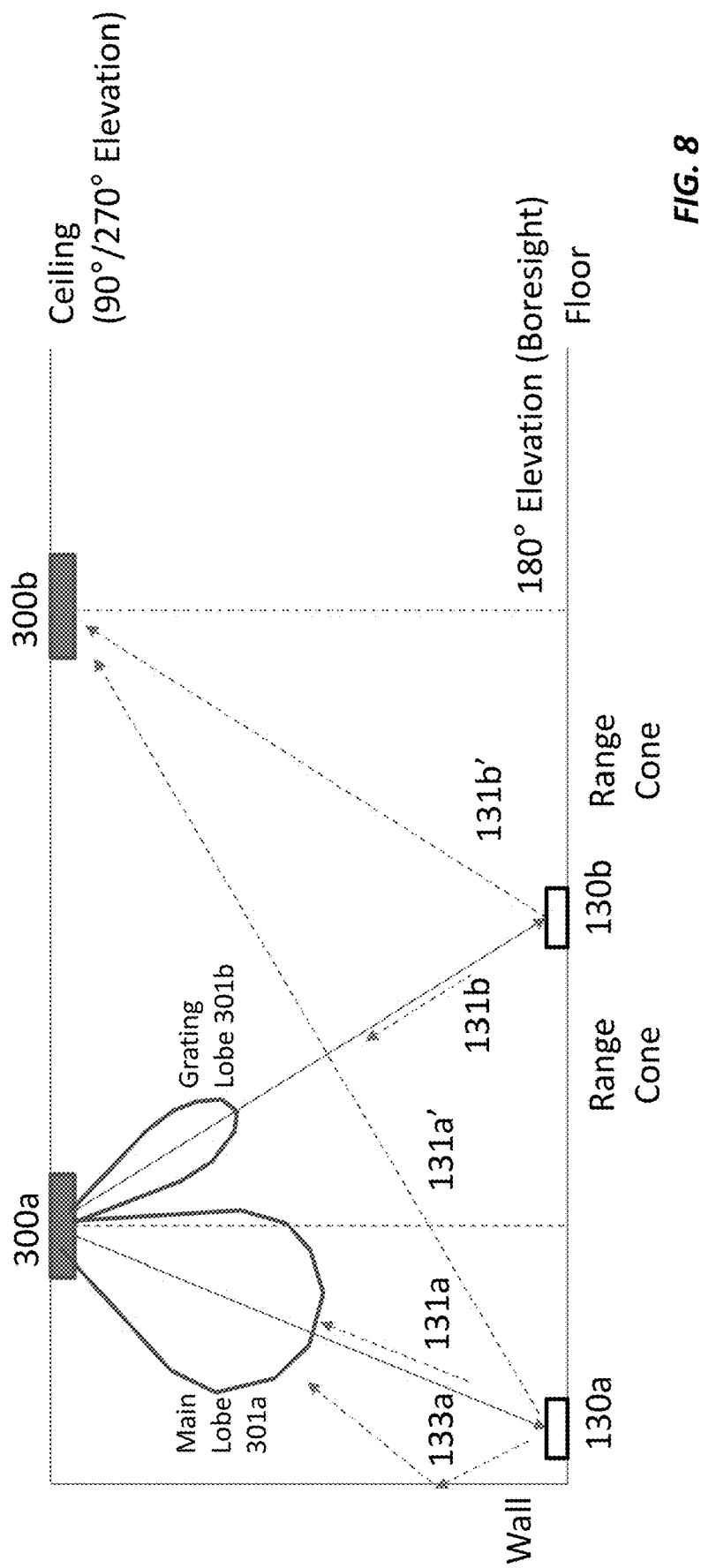
FIG. 8 illustrates how main and grating lobes from an antenna array with a pitch of more than half a wavelength can excite responses from RFID tags in desired and undesired directions.
Figure 9A:
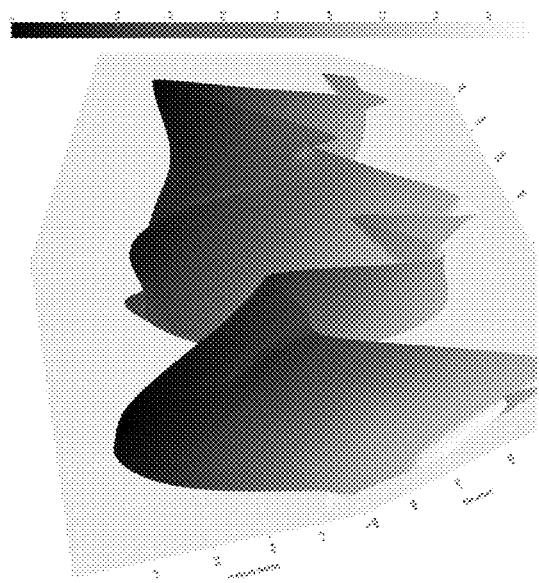
FIGS. 9A-9D are linear and logarithmic plots of the gain pattern of a four-element square antenna array with a pitch greater than half a wavelength steered to transmit at boresight (180°).
Figure 9B:
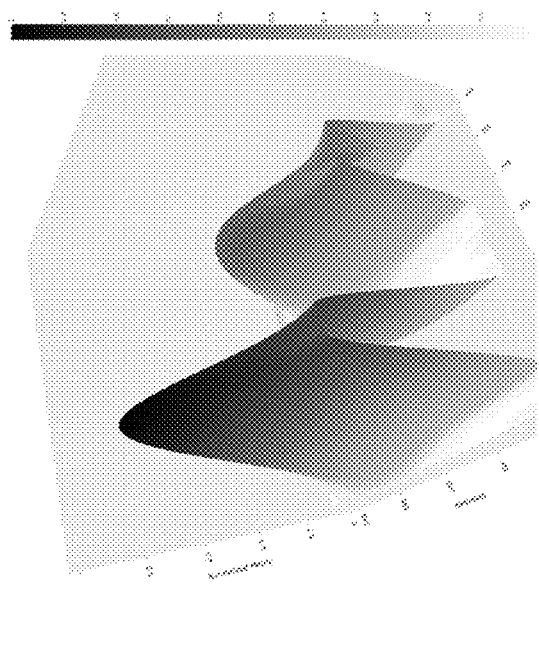
Figure 9C:
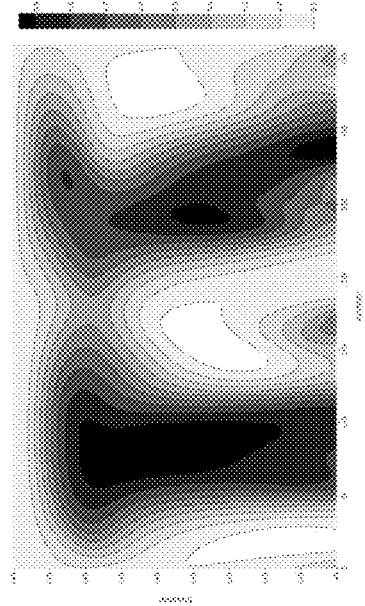
Figure 9D:
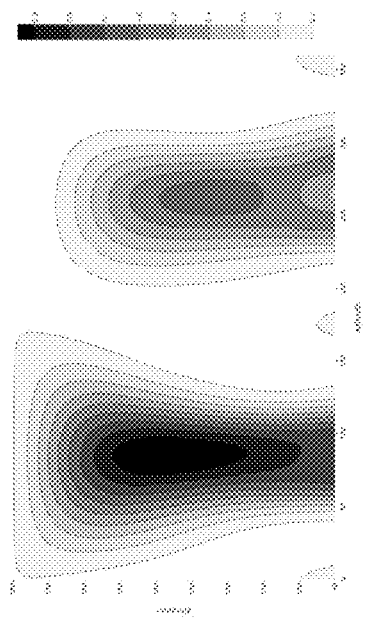

FIG. 8 illustrates how antenna arrays 300a and 300b with pitches of more than half a wavelength at the interrogation signal carrier frequency interrogate RFID tags 130a-130c. In this example, the antenna arrays 300a and 300b are mounted in or on the ceiling (e.g., in place of ceiling tiles in a drop ceiling as shown in FIG. 3J or 3K) and radiate downward toward the floor. The interrogation signals transmitted by each antenna array 300a and 300b can be steered by adjusting the phases of the RF signals fed to the patch antenna elements as described above. Changing the hop frequency also steers the antenna pattern due to beam squint as described below.

In FIG. 8, antenna array 300a is in interrogator mode and antenna array 300b is in listener mode. The main lobe 301a of antenna array 300a is steered in the direction of RFID tag 130a at an elevation angle of 135° and an azimuth angle of 0°. The antenna gain falls off sharply (e.g., by 27-30 dB) away from the main lobe 301a until reaching an elevation angle at which a grating lobe 301b appears. The grating lobe 301b may have an amplitude within a few decibels of the amplitude of the main lobe 301a.

At this steering angle, interrogation signals transmitted by the antenna array 300a elicit replies from a tag 130a in the direction of the main lobe 301a and from a tag 130b in the direction of the grating lobe 301b. The antenna array 300a in interrogator mode detects the replies from the tags 130a and 130b along AOAs 131a and 131b, respectively. Similarly, the antenna array 300b in listener mode detects the replies from the tags 130a and 130b along AOAs 131a' and 131b', respectively. Each antenna array 300a, 300b may also detect multipath signals 133a caused by the replies reflecting or scattering off walls and/or other surfaces in the environment.

The antenna array 300a in interrogator mode may transmit interrogation signals and detect replies from the RFID tags 130a and 130b at each of several different carrier frequencies. (The antenna array 300b in listener mode detects these interrogation signals and replies as well.) The system controller (not shown) and/or RFID tag reader electronics coupled to the antenna arrays 300a and 300b estimate the AOAs 131a, 131b, 131a', 131b', and 133 for each detected signal based on the relative phases and frequencies of the signals detected by the different patch antenna elements in the antenna arrays 300a and 300b. In this example, the angular spectrum of the signal received by the antenna array 300a in interrogator mode has three peaks: one peak for the line-of-sight (LOS) path 131a to tag 130a, one peak for the LOS path 131b to tag 130b, and one peak for the non-LOS path 133 to tag 130a. The relative amplitudes of these peaks depend on the ranges to the tags 130a and 130b, the presence of obstructions, and the tags 130a and 130b themselves (e.g., their orientations and efficiencies), among other factors. Even knowing the elevation and azimuth angles of the main lobe for the transmitted interrogation signal, it may be difficult to determine which peak represents the true AOA 131a to the tag 130a in the direction of the main lobe without more information.

Fortunately, spurious AOAs can be filtered out using a number of different techniques, including boxing, angular filtering, and triangulation with AOA measurements by other readers. Boxing involves a priori knowledge of the room size, obstacle locations, and/or the range of the reader (antenna array 300a). In this example, the multipath AOA 133 is produced by a signal reflected off of a wall whose size and location are known beforehand. Linearly extrapolating along this AOA 133 places the tag location on the far side of the wall from the reader 300a. The RFID tag reader electronics therefore discard this location as being outside of a box defined by the room (with the wall providing one side of the box), leaving the true AOA 131a and location of the tag 130a (in addition to the AOA 131b and location of the tag 130b in the grating lobe direction). The box can be updated based on changes to the room, such as movement of obstacles within the room or introduction or removal of obstacles.

In angular filtering, the system controller and/or RFID tag reader electronics discard AOAs that fall outside a predetermined range of elevation angles (e.g., within 1°, 5°, 10°, 15°, 20°, 25°, or 30° of the plane of the ceiling). This range may be based on the orientation of the ceiling, the distance between adjacent readers 300a and 300b, and/or the effective range of each reader. For instance, if each reader has an effective range R (e.g., 10 meters) and is separated from its nearest neighbor by a distance D (e.g., meters), then the threshold may be set to $\tan^{-1}$ (D/R) (e.g., excluding AOAs within about 38° of the ceiling). The threshold can also be set based on the heights and locations of shelves or other fixtures that hold RFID tags to eliminate tag locations that are too close to the ceiling to be realistic.

This threshold elevation angle may vary with the angle of the main lobe in the transmit pattern and the relative locations of the readers. In FIG. 8, for example, the system controller and/or RFID tag reader electronics may discard the AOA 131b' as being too close to boresight given the steering angle of the main lobe 301a and distance between the readers 300a and 300b. The threshold elevation angle may also vary with azimuth to account for the azimuthal variation in the antenna gain of the antenna array illustrated in FIGS. 7A-7F.

Triangulation involves measuring AOAs to an RFID tag with multiple antenna arrays. This can be accomplished sequentially or simultaneously, with one reader in interrogator mode and one or more readers in listener mode as described above. In FIG. 8, for example, each reader 300a, 300b identifies at least two possible AOAs for each interrogation signal, with one AOA 131a, 131a' pointing to the tag 130a in the direction of the main lobe 301a and the other AOA 131b, 131b' pointing to the tag 130b in the direction of the grating lobe 301b. The system controller and/or reader electronics compute the possible AOAs and determine whether or not they intersect or come close to intersecting (e.g., within a certain radius or margin of error). The true AOAs should intersect or come close to intersecting at the tag's true location. Other AOAs may not intersect at all or may intersect at locations that are outside the accepted angular ranges or outside the room where the tags should be located. If the computed AOAs yield more than one possible location for the tag (e.g., locations for both tags 130a and 130b), then the system controller can pick the estimated location that intersects with or comes closest to intersecting with the elevation and azimuth angles of the main lobe 301a (e.g., the location for tag 130a).

If the AOAs do not intersect, the system controller may pick AOAs that are separated by less than a threshold distance at their closest. This threshold distance may be based on the measurement error associated with the AOAs and/or the angular resolution of the antenna array(s). The system controller can also update the triangulation with AOAs from one or more other readers to resolve the ambiguity. Although this increases the computational complexity, computational load, and/or processing time, the increase in isolation/reduction in crosstalk due to the increased antenna element spacing outweighs the computational penalty.

FIGS. 9A-9D show AOA spectra on linear and logarithmic scales. Each plot has several peaks.

Beam Squint

FIGS. 10A-10C illustrate another problem associated with antenna arrays: beam squint. More specifically, FIGS. 10A, 10B, and 10C show antenna patterns for a 32-element linear antenna array steered off boresight by angles of 20°, 40°, and 60°, respectively. Each plot shows traces for antenna patterns at 9 GHz, 10 GHz, and 11 GHz. In each case, the phase delay steers the main lobe farther at higher frequencies. This frequency-dependent beam steering becomes more pronounced at larger angles and is called beam squint. Beam squint occurs in antenna arrays that are steered by adjusting the phases (as opposed to the time delays) of the signals that they transmit and/or receive. Because phase depends on frequency (a time delay is a linear phase shift versus frequency), tuning the phase shifts the steering angle as a function of the frequency of the signal that the antenna array is transmitting or receiving. The antenna array 300 in FIG. 3 is steered using variable phase shifters 312a-312d and hence suffers from beam squint.

Beam squint is deterministic—it is repeatable and can be calculated or measured—and so can be used to distinguish a grating lobe from main lobe. To see how, consider the main and grating lobes in the antenna patterns shown in FIGS. 4, 6A-6F, and 7A-7F. Changing the frequency shifts the angles associated with both lobes, but by different amounts as illustrated in FIGS. 10A-10C: the main and grating lobes shift by different amounts for the same frequency shift because they are steered to different angles.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A radio-frequency identification (RFID) tag reader comprising:
   a signal generator to generate an interrogation signal at a carrier frequency;
   an antenna array, operably coupled to the signal generator, to transmit the interrogation signal to an RFID tag in a direction of a main lobe of an antenna pattern of the antenna array and to receive a reply to the interrogation signal from the RFID tag, the antenna array comprising antenna elements arrayed at a pitch of more than half a wavelength of the carrier frequency of the interrogation signal, the pitch causing a grating lobe to appear in the antenna pattern when the main lobe is steered off boresight; and
   a processor, operably coupled to the antenna array, to distinguish the reply to the interrogation signal from the RFID tag from a spurious reply caused by the grating lobe when the main lobe is steered off boresight and to estimate a location of the RFID tag based on the reply to the interrogation signal from the RFID tag.

2. The RFID tag reader of claim 1, wherein the pitch of the antenna elements is at least 190 millimeters.

3. The RFID tag reader of claim 1, wherein setting the pitch of the antenna elements to be more than half the wavelength of the carrier frequency reduces crosstalk between the antenna elements.

4. The RFID tag reader of claim 1, wherein the antenna array further comprises a ground plane parallel to and spaced apart from the antenna elements by a distance of at least 22 millimeters.

5. The RFID tag reader of claim 4, wherein the ground plane is a circular ground plane.

6. The RFID tag reader of claim 4, wherein the ground plane has lateral dimensions of at least 20 inches by at least 20 inches.

7. The RFID tag reader of claim 4, wherein the ground plane has lateral dimensions of 24 inches by 24 inches.

8. The RFID tag reader of claim 4, wherein the ground plane has lateral dimensions of 595 millimeters by 595 millimeters.

9. The RFID tag reader of claim 4, wherein the ground plane is configured to drop into an opening of a suspension grid of a drop ceiling.

10. The RFID tag reader of claim 4, further comprising:
    a decorative panel that transmits the interrogation signal and the reply and hides the antenna array; and
    at least one vertical member mechanically coupling the ground plane to the decorative panel.

11. The RFID tag reader of claim 1, wherein the antenna array has an antenna gain on boresight that is at least 27 dB greater than the antenna gain at an elevation of 90° off boresight.

12. The RFID tag reader of claim 1, wherein the processor is configured to distinguish the reply to the interrogation signal from the RFID tag from the spurious reply by discarding signals corresponding to estimated RFID tag locations outside of a predetermined volume.

13. The RFID tag reader of claim 1, wherein the processor is configured to distinguish the reply to the interrogation signal from the RFID tag from the spurious reply by discarding signals having angles-of-arrival exceeding a predetermined threshold.

14. The RFID tag reader of claim 1, wherein the processor is configured to distinguish the reply to the interrogation signal from the RFID tag from the spurious reply by determining possible positions of the RFID tag based on angles-of-arrival measured by other RFID tag readers and discarding possible positions of the RFID tag outside a predetermined zone.

15. The RFID tag reader of claim 1, further comprising:
a switch, operably coupling the signal generator to the antenna array, to switch the antenna array between a first mode in which the antenna array emits the interrogation signal as a circularly polarized interrogation signal and a second mode in which the antenna array emits the interrogation signal as a linearly polarized interrogation signal.

16. The RFID tag reader of claim 15, wherein the switch is further configured, in the second mode, to switch the interrogation signal between a first linear polarization state and a second linear polarization state orthogonal to the first linear polarization state.

17. The RFID tag reader of claim 1, further comprising:
a mounting bracket, mechanically coupled to the antenna array, to secure the antenna array with respect to a ceiling.

18. The RFID tag reader of claim 17, further comprising:
an adjustment mechanism, mechanically coupled to the mounting bracket and/or to the antenna array, to adjust an alignment of the antenna array with respect to a ceiling.

19. A method of locating a radio-frequency identification (RFID) tag, the method comprising:
generating an interrogation signal at a carrier frequency;
transmitting, with an antenna array comprising antenna elements arrayed at a pitch of more than half a wavelength of the carrier frequency of the interrogation signal, the interrogation signal to an RFID tag in a direction of a main lobe of an antenna pattern of the antenna array;
receiving, by the antenna array, a reply to the interrogation signal from the RFID tag;
distinguishing the reply to the interrogation signal from the RFID tag from a spurious reply caused by a grating lobe that appears in the antenna pattern when the main lobe is steered off boresight due to the pitch of the antenna array; and
estimating a location of the RFID tag based on the reply to the interrogation signal from the RFID tag.

\* \* \* \* \*